(12) United States Patent
Kinuta

(10) Patent No.: US 12,329,051 B2
(45) Date of Patent: Jun. 17, 2025

(54) AUTOMATIC TRAVEL SYSTEM

(71) Applicant: Yanmar Power Technology Co., Ltd., Osaka (JP)

(72) Inventor: Keishi Kinuta, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 275 days.

(21) Appl. No.: 17/598,221

(22) PCT Filed: Mar. 12, 2020

(86) PCT No.: PCT/JP2020/010794
§ 371 (c)(1),
(2) Date: Sep. 24, 2021

(87) PCT Pub. No.: WO2020/195890
PCT Pub. Date: Oct. 1, 2020

(65) Prior Publication Data
US 2022/0183211 A1 Jun. 16, 2022

(30) Foreign Application Priority Data
Mar. 25, 2019 (JP) ................................ 2019-056329

(51) Int. Cl.
*A01B 69/04* (2006.01)
*G05D 1/43* (2024.01)
*G05D 1/648* (2024.01)

(52) U.S. Cl.
CPC ............. *A01B 69/008* (2013.01); *G05D 1/43* (2024.01); *G05D 1/648* (2024.01)

(58) Field of Classification Search
CPC .. A01B 69/008; G05D 1/0061; G05D 1/0219; G05D 2201/0201; G05D 1/0212
See application file for complete search history.

(56) References Cited

U.S. PATENT DOCUMENTS

2004/0181896 A1* 9/2004 Egawa ................. G05D 1/0274
   15/319
2020/0288622 A1* 9/2020 Nishii .................... A01B 69/00

FOREIGN PATENT DOCUMENTS

| CN | 108919792 A | * 11/2018 | ........... G05D 1/0212 |
| EP | 3940493 A1 | 1/2022 | |
| EP | 3557360 B1 | * 8/2022 | ............ A01B 69/00 |
| JP | 05173636 A | 7/1993 | |
| JP | 2018099113 A | 6/2018 | |

(Continued)

OTHER PUBLICATIONS

Zhao et al., CN 108919792 A, English Translation provided by IP.com, Filed May 30, 2018, Published Nov. 30, 2018 (Year: 2018).*

(Continued)

*Primary Examiner* — Thomas E Worden
*Assistant Examiner* — Benjamin J Brosh
(74) *Attorney, Agent, or Firm* — Chris Mizumoto

(57) ABSTRACT

An automatic travel system is provided with a storage unit that stores a first reference line and a second reference line; a travel path generation unit that generates parallel paths, each of which is parallel to the first reference line or the second reference line; and an automatic travel control unit that causes a work vehicle to travel automatically along the parallel paths generated by the travel path generation unit.

5 Claims, 17 Drawing Sheets

(56) References Cited

FOREIGN PATENT DOCUMENTS

| | | | | |
|---|---|---|---|---|
| JP | 2018116615 A | | 7/2018 | |
| JP | 2018117558 A | * | 8/2018 | ........... A01B 69/008 |
| WO | WO-2014105281 A1 | * | 7/2014 | ........... A01B 69/008 |
| WO | 2015119263 A1 | | 8/2015 | |
| WO | WO-2017110116 A1 | * | 6/2017 | ............. A01B 69/00 |
| WO | WO-2017159801 A1 | * | 9/2017 | ........... A01B 69/008 |

OTHER PUBLICATIONS

Ogura et al., WO 2017/159801 A1, English Translation provided by IP.com, Filed Mar. 16, 2017, Published Sep. 21, 2017 (Year: 2017).*
Miyamoto et al., JP 2018-117558 A, English Translation provided by IP.com, Filed Jan. 24, 2017, Published Aug. 2, 2018 (Year: 2018).*

\* cited by examiner

AUTOMATIC TRAVEL SYSTEM

CROSS-REFERENCE

This application is a US National Stage Application under 35 U.S.C. § 371 of International Application No. PCT/JP2020/010794 filed Mar. 12, 2020, which claims foreign priority of JP2019-056329 filed Mar. 25, 2019, the disclosures of which are hereby incorporated by reference in their entirety.

TECHNICAL FIELD

The present invention relates to an automatic travel system that causes a work vehicle to automatically travel along a target travel path.

BACKGROUND ART

The above-described automatic travel system sets a reference line as a target travel path and causes a work vehicle to automatically travel straight along the reference line (see, for example, Patent Literature 1). In the system described in Patent Literature 1, for example, the reference line is set by operating a setting device, or the like, after performing an adjustment operation to adjust the orientation of the work vehicle in a straight direction at a work start position.

CITATION LIST

Patent Literature

Patent Literature 1: Japanese Unexamined Utility Model Application Publication No. 2-17011

DISCLOSURE OF INVENTION

Problems to be Solved by the Invention

In the system described in Patent Literature 1, in order to set the reference line, an adjustment operation needs to be performed to adjust the orientation of the work vehicle in the straight direction at the work start position. Therefore, in order to set a different reference line, it is necessary to perform an adjustment operation to adjust the orientation of the work vehicle in the straight direction at the work start position again, which increases the work load on the user, or the like, and reduces the work efficiency.

Furthermore, a reference path is generated based on a movement trajectory or the like when the user or the like drives and operates the work vehicle so as to cause the work vehicle to actually travel, and a target travel path corresponding to the reference path is generated. In this case, for example, a target travel path including a plurality of parallel paths, which are arranged parallel to the reference path, is generated.

However, although automatic travel along the parallel path, which is parallel to the reference path, is possible, the user or the like may desire automatic travel in a direction that is not parallel to the reference path. Therefore, in the case of automatic travel in a direction that is not parallel to the reference path, the user or the like needs to drive and operate the work vehicle again so as to cause the work vehicle to actually travel, which also increases the work load on the user or the like and reduces the work efficiency.

In consideration of this circumstance, a principal issue of the present invention is to provide an automatic travel system that may reduce the work load on the user or the like and improve the work efficiency.

Means for Solving the Problems

A first characteristic configuration of the present invention is to include a storage unit that stores a first reference line and a second reference line; a travel path generation unit that generates a parallel path that is parallel to the first reference line or the second reference line; and an automatic travel control unit that causes a work vehicle to automatically travel along the parallel path generated by the travel path generation unit.

With this configuration, the travel path generation unit may generate the parallel path that is parallel to the second reference line as well as the first reference line stored in the storage unit. The automatic travel control unit may cause the work vehicle to automatically travel along not only the parallel path that is parallel to the first reference line but also the parallel path that is parallel to the second reference line so as to efficiently conduct a predetermined work. This eliminates the need for the user or the like to perform an additional adjustment operation or manually drive the work vehicle in order to conduct automatic travel along the parallel path that is parallel to the second reference line. Thus, the work vehicle automatically travels along not only the parallel path that is parallel to the first reference line but also the parallel path that is parallel to the second reference line while the work load on the user is reduced, whereby the work efficiency may be improved.

A second characteristic configuration of the present invention is that the travel path generation unit selects any reference line from the first reference line and the second reference line based on position information on the work vehicle and generates the parallel path that passes through a current position of the work vehicle and is parallel to the selected reference line.

With this configuration, when the user or the like has moved the work vehicle to a desired work start point or the like, the travel path generation unit may select any reference line from the first reference line and the second reference line based on the current position information on the work vehicle and generate the parallel path that passes through the current position of the work vehicle and is parallel to the selected reference line. Therefore, the user may perform automatic travel along the parallel path corresponding to the work start point simply by moving the work vehicle to the work start point, or the like, which may result in an effective reduction in the work load of the user and appropriate automatic travel.

A third characteristic configuration of the present invention is that the travel path generation unit is capable of generating, as the parallel path, a plurality of first parallel paths that are parallel to the first reference line at a predetermined interval and is capable of generating a second parallel path that passes through the current position of the work vehicle and is parallel to the second reference line.

With this configuration, the travel path generation unit may generate the plurality of first parallel paths having a predetermined interval as a working width and may generate the second parallel path corresponding to the current position of the work vehicle. For example, while the plurality of first parallel paths may be generated to conduct a predetermined work during automatic travel in a central area of a work region, the plurality of second parallel paths corresponding to the shape, or the like, of the work region may be generated to conduct the predetermined work during automatic travel in the surrounding area around the central area. Thus, the work may be efficiently conducted during the automatic travel while the first parallel path or the second parallel path is generated in accordance with various situations such as the shape of the work region. Furthermore, with regard to the first parallel path, as the plurality of first parallel paths is generated, the automatic travel may be performed while the already generated first parallel path is set as a target, and the automatic travel along the first parallel path may be performed efficiently and appropriately.

A fourth characteristic configuration of the present invention is that the automatic travel control unit is capable of causing the work vehicle to automatically travel in the plurality of parallel paths and allows manual travel of the work vehicle during a movement from the parallel path to the subsequent parallel path, and a notification control unit is included which, when manual travel of the work vehicle from the parallel path to the subsequent parallel path is conducted, provides notification indicating a deviation between a position of the work vehicle after an end of the manual travel and a start position of automatic travel in the subsequent parallel path.

With this configuration, when the manual travel of the work vehicle from the parallel path to the subsequent parallel path is conducted, the notification control unit provides the notification indicating the deviation between the position of the work vehicle after the end of the manual travel and the start position of automatic travel in the subsequent parallel path, which enables the guide to the start position of the automatic travel in the subsequent parallel path. This enables smooth start of the automatic travel in the subsequent parallel path and efficient and appropriate automatic travel along the subsequent parallel path.

DESCRIPTION OF EMBODIMENTS

Embodiments of an automatic travel system according to the present invention will be described with reference to the drawings.

First Embodiment

Figure 1:
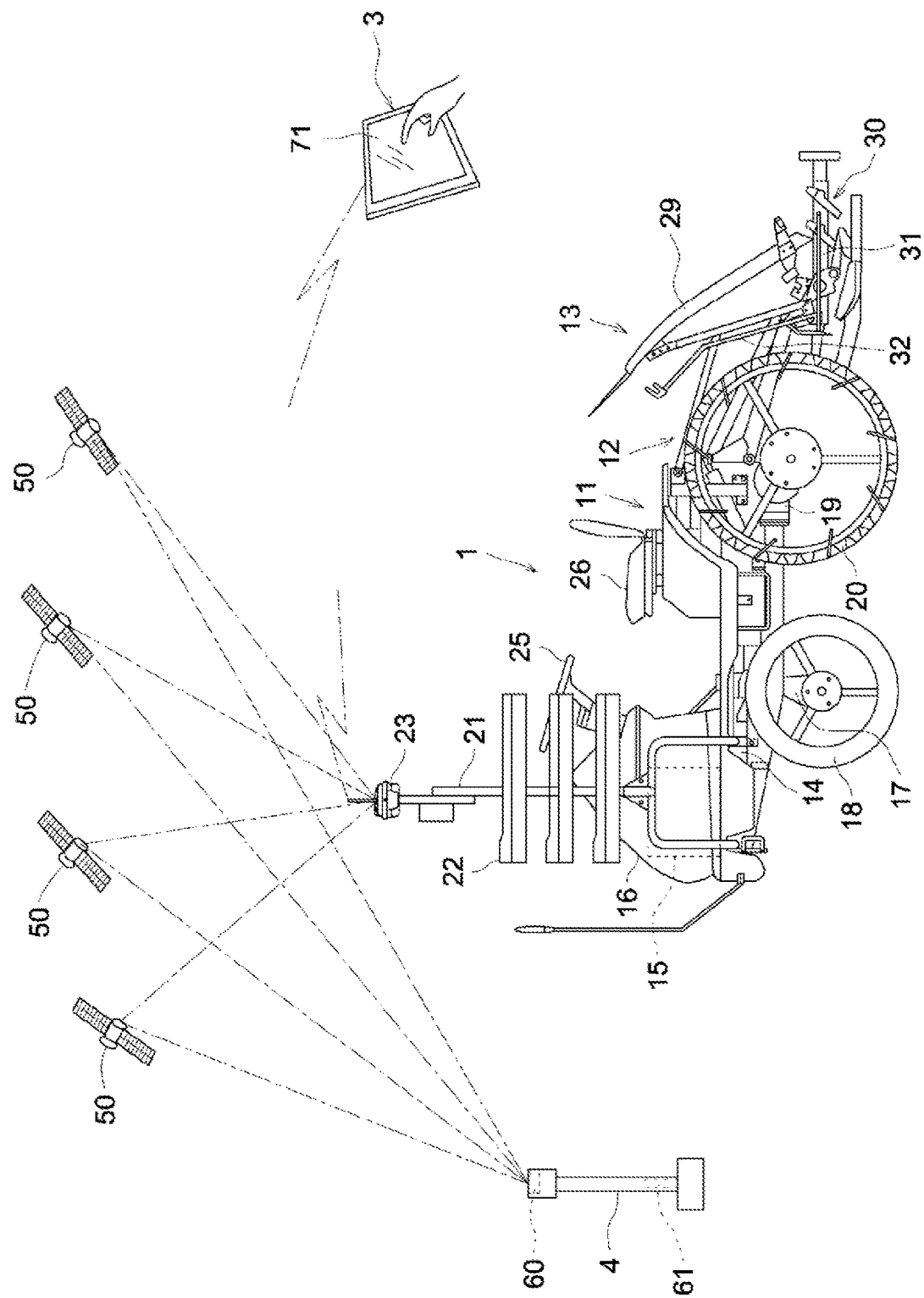
FIG. 1 is a diagram illustrating a schematic configuration of an automatic travel system.

As illustrated in FIG. 1, the automatic travel system uses a rice transplanter 1 as a work vehicle but may adopt, other than a rice transplanter, a riding work vehicle such as a tractor, a combine harvester, a riding grass mower, a wheel loader, or a snowplow, and an unmanned work vehicle such as an unmanned grass mower.

Figure 2:
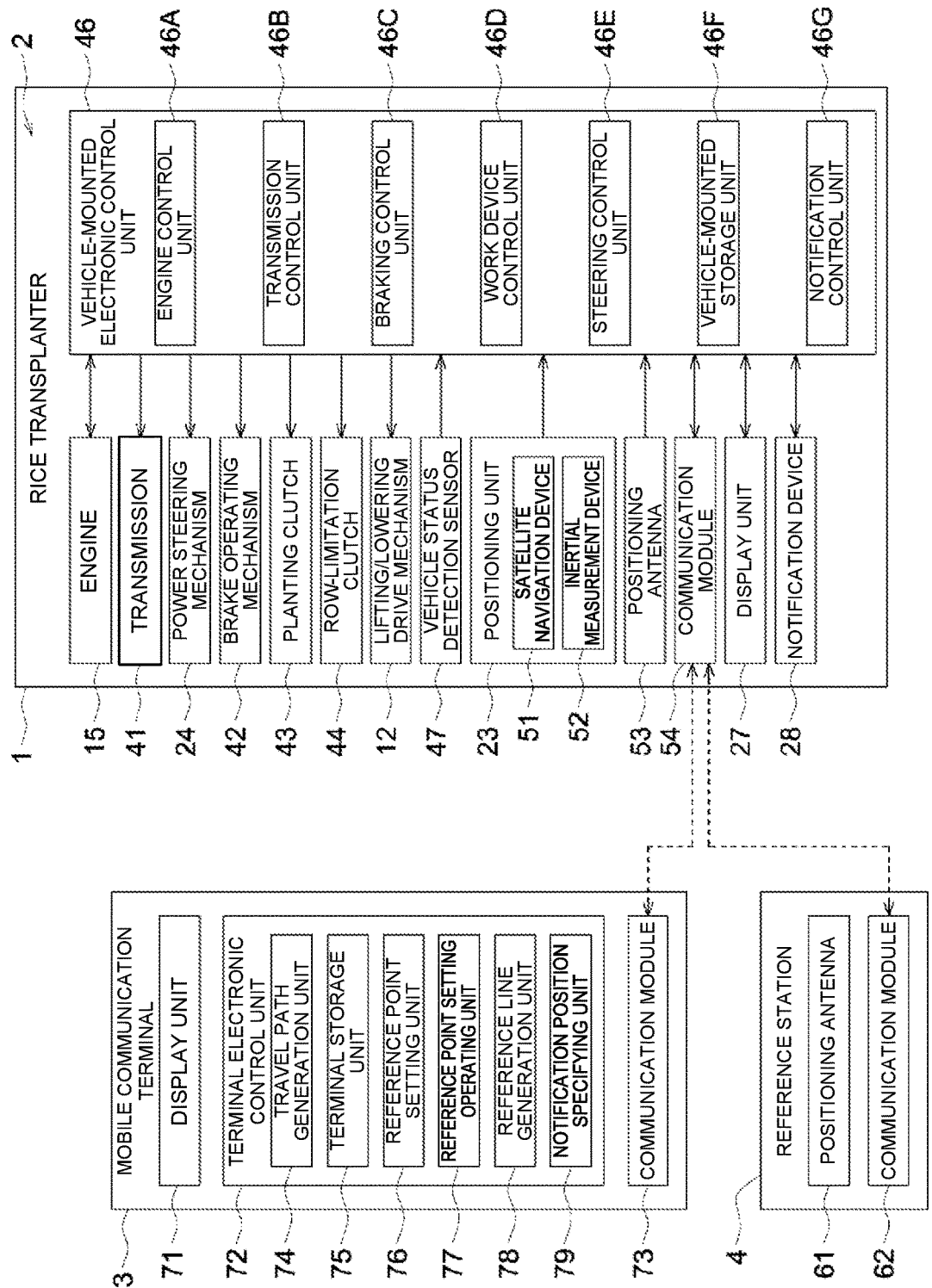
FIG. 2 is a block diagram illustrating a schematic configuration of the automatic travel system.

As illustrated in FIGS. 1 and 2, the automatic travel system includes an automatic travel unit 2 mounted on the rice transplanter 1 and a mobile communication terminal 3 having communication settings so as to communicate with the automatic travel unit 2. A tablet personal computer, a smartphone, or the like, including a touchable touch-panel display unit 71 (e.g., liquid crystal panel) may be used as the mobile communication terminal 3.

The rice transplanter 1 includes a travel machine body 11 and a planting unit 13 at a rear portion of the travel machine body 11 via a lifting/lowering drive mechanism 12. The travel machine body 11 includes an engine 15 provided as a power source at a front upper portion of a vehicle body frame 14 extending in a front-back direction and a hood 16 covering the engine 15.

A front axle case 17 is supported at a front portion of the vehicle body frame 14, and front wheels 18 are mounted on both the right and left sides of the front axle case 17. A rear axle case 19 is supported at a rear portion of the vehicle body frame 14, and rear wheels 20 are mounted on both the right and left sides of the rear axle case 19.

On the side of the hood 16, a gate-shaped spare seedling table frame 21 is provided to project from the vehicle body frame 14, and spare seedling tables 22 are provided on both the right and left sides of the spare seedling table frame 21. A positioning unit 23 is provided at an upper horizontal center of the spare seedling table frame 21.

A steering wheel 25 that enables manual steering of the right and left front wheels 18 via a power steering mechanism 24, a driver seat 26 for a passenger, and the like, are provided behind the hood 16. A dashboard at the rear portion of the hood 16 includes an operation-panel display unit 27 (see FIG. 2), a notification device 28 (see FIG. 2), etc.

The planting unit 13 includes a seedling table 29 where seedling mats are placed and a plurality of rotary planting devices 30 that plants seedlings in a work field such as a farm field. The seedling table 29 is provided in an inclined posture such that the front side is higher and the rear side is lower and is movable in the right-left direction. The number of the planting devices 30 provided corresponds to the number of rows for a planting operation and, for example, in the case of six-row planting, the six planting devices 30 are provided. The planting device 30 is provided at a rear portion of a planting transmission case 31.

In the planting unit 13, when power is transmitted from the engine 15 via a planting clutch 43 (see FIG. 2), the planting devices 30 rake out a predetermined number of seedlings from the seedling table 29 and plant them in a work field such as a farm field. A row-limitation clutch 44 (see FIG. 2) is provided for each of the planting devices 30 and is configured so as to switch on/off the power transmission to each of the planting devices 30. Markers 32 are provided on both the right and left sides of the seedling table 29 to put a mark serving as a guide for a work in the subsequent process in the work field such as a farm field. The marker 32 is provided so as to swing between an operating position by projecting outward to put a mark in the work field and a non-operating position by retracting upward, and a marker operating mechanism 45 (see FIG. 2) is provided so as to drive and operate the marker 32 between the operating position and the non-operating position.

As illustrated in FIG. 2, the rice transplanter 1 includes an electronically controlled transmission 41 that shifts gears with power from the engine 15, the full hydraulic power steering mechanism 24 that steers the right and left front wheels 18, a brake operating mechanism 42 that operates a brake device, the planting clutch 43 that switches on/off the power transmission to the planting unit 13, the row-limitation clutch 44 that switches on/off the power transmission to each of the planting devices 30 in the planting unit 13, the electrohydraulic control lifting/lowering drive mechanism 12 that drives the planting unit 13 so as to be lifted and lowered, the marker operating mechanism 45 that drives and operates the marker 32 to the operating position and the non-operating position, a vehicle-mounted electronic control unit 46 that includes various control programs, or the like, for automatic travel of the rice transplanter 1, and the like, a vehicle status detection sensor 47 that detects various vehicle statuses in the rice transplanter 1, etc.

Furthermore, a hydromechanical non-stage transmission (HMT), a hydrostatic non-stage transmission (HST), a belt-type non-stage transmission, or the like, may be used as the transmission 41. The electric power steering mechanism 24, or the like, including an electric motor may be used as the power steering mechanism 24. For example, an engine rotation velocity sensor that detects the rotation velocity of the engine 15, a vehicle velocity sensor that detects the vehicle velocity of the rice transplanter 1, or a rudder angle sensor that detects the steering angle of the front wheel 18 is provided as the vehicle status detection sensor 47.

As illustrated in FIG. 2, the vehicle-mounted electronic control unit 46 includes an engine control unit 46A that controls operation of the engine 15, a transmission control unit 46B that controls operation of the transmission 41, a braking control unit 46C that controls operation of the brake operating mechanism 42, a work device control unit 46D that controls operation of the work device such as the planting unit 13, a steering control unit 46E that controls operation of the power steering mechanism 24 in accordance with the target steering angles of the right and left front wheels 18 during automatic travel, a non-volatile vehicle-mounted storage unit 46F that stores a generated target travel path P (for example, see FIG. 6) for automatic travel, etc.

As illustrated in FIG. 2, the positioning unit 23 includes a satellite navigation device 51 that measures the current position and the current orientation of the rice transplanter 1 using a GPS (Global Positioning System) that is an example of a navigation satellite system (NSS: Navigation Satellite System), an inertial measurement device (IMU: Inertial Measurement Unit) 52 that includes a three-axis gyroscope, a three-direction acceleration sensor, or the like, to measure the posture, orientation, and the like, of the rice transplanter 1, etc. GPS-based positioning methods include DGPS (Differential GPS: differential positioning method), RTK-GPS (Real Time Kinematic GPS: interferometric positioning method), etc. According to the present embodiment, RTK-GPS suitable for movable body positioning is adopted. Therefore, as illustrated in FIGS. 1 and 2, a reference station 4 that enables positioning by RTK-GPS is installed at a known position around a work region in a farm field, etc.

As illustrated in FIG. 2, the rice transplanter 1 and the reference station 4 include positioning antennas 53, 61 that receive radio waves transmitted from a positioning satellite 50 (see FIG. 1), communication modules 54, 62 that enable wireless communications of various types of information including positioning information (correction information) between the rice transplanter 1 and the reference station 4, etc. This allows the satellite navigation device 51 to measure the current position and the current orientation of the rice transplanter 1 with high accuracy based on the positioning information obtained when the positioning antenna 53 on the rice transplanter side receives radio waves from the positioning satellite 50 and the positioning information (correction information for measuring the current position of the rice transplanter 1) obtained when the positioning antenna 61 on the base station side receives radio waves from the positioning satellite 50. Furthermore, the positioning unit 23 includes the satellite navigation device 51 and the inertial measurement device 52 so as to measure the current position, the current orientation, and the posture angle (yaw angle, roll angle, pitch angle) of the rice transplanter 1 with high accuracy.

As illustrated in FIG. 2, the mobile communication terminal 3 includes a terminal electronic control unit 72 having various control programs, and the like, to control operation of the display unit 71, etc., a communication module 73 that enables wireless communications of various types of information including positioning information with the communication module 54 on the rice transplanter side, etc. The terminal electronic control unit 72 includes a travel path generation unit 74 that generates a target travel path P (e.g., see FIG. 6) for causing the rice transplanter 1 to automatically travel, a non-volatile terminal storage unit 75 that stores various types of input information, which is input by a user, the target travel path P generated by the travel path generation unit 74, etc.

A method for generating the target travel path P by the travel path generation unit 74 will be described below. The target travel path P generated by the travel path generation unit 74 is displayable on the display unit 71 and is stored in the terminal storage unit 75 as path information. The path information includes the azimuth of the target travel path P and the set engine rotation velocity, target travel velocity, and the like, which are set in accordance with a travel mode, or the like, of the rice transplanter 1 on the target travel path P.

When the travel path generation unit 74 thus generates the target travel path P, the terminal electronic control unit 72 transfers the path information from the mobile communication terminal 3 to the rice transplanter 1 so that the vehicle-mounted electronic control unit 46 of the rice transplanter 1 may obtain the path information. The vehicle-mounted electronic control unit 46 may cause the rice transplanter 1 to automatically travel along the target travel path P while using the positioning unit 23 to acquire its own current position (the current position of the rice transplanter 1)

based on the acquired path information. The current position of the rice transplanter 1 acquired by the positioning unit 23 is transmitted from the rice transplanter 1 to the mobile communication terminal 3 in real time (e.g., in a cycle of several milliseconds) so that the mobile communication terminal 3 determines the current position of the rice transplanter 1.

To cause the rice transplanter 1 to automatically travel, the user operates the display unit 71 of the mobile communication terminal 3 to give an instruction to start the automatic travel when various automatic travel start conditions are satisfied. Upon receiving the instruction to start the automatic travel, the vehicle-mounted electronic control unit 46 performs automatic travel control so as to cause the rice transplanter 1 to automatically travel along the target travel path P while acquiring its own current position (the current position of the rice transplanter 1) by the positioning unit 23. The vehicle-mounted electronic control unit 46 is configured as an automatic travel control unit that performs automatic travel control so as to cause the rice transplanter 1 to automatically travel along the target travel path P based on the positioning information on the rice transplanter 1 acquired by the positioning unit 23 using the satellite positioning system.

The automatic travel control includes automatic engine control to automatically control operation of the engine 15, automatic transmission control to automatically control operation of the transmission 41, braking control to automatically control operation of the brake operating mechanism 42, automatic steering control to automatically steer the right and left front wheels 18, automatic control for work to automatically control operation of the work device such as the planting unit 13, etc.

During the automatic engine control, the engine control unit 46A automatically controls operation of the engine 15 such that the rotation velocity of the engine 15 becomes the set engine rotation velocity based on detection information of the engine rotation velocity sensor in the vehicle status detection sensor 47.

During the automatic transmission control, the transmission control unit 46B automatically controls operation of the transmission 41 to obtain the target travel velocity, which is set in accordance with the travel mode, or the like, of the rice transplanter 1 on the target travel path P, as the vehicle velocity of the rice transplanter 1 based on the path information on the target travel path P, the output of the positioning unit 23, and the output of the vehicle velocity sensor in the vehicle status detection sensor 47.

During the automatic braking control, the braking control unit 46C automatically controls operation of the brake operating mechanism 42 so as to properly apply a brake in a braking area included in the path information on the target travel path P based on the target travel path P and the output of the positioning unit 23.

During the automatic steering control, in order for the rice transplanter 1 to automatically travel along the target travel path P, the steering control unit 46E automatically controls operation of the power steering mechanism 24 such that the target steering angle is obtained as the steering angle of the right and left front wheels 18 on the basis of the target steering angle based on the path information on the target travel path P and the output of the rudder angle sensor in the vehicle status detection sensor 47.

During the automatic control for work, the work device control unit 46D automatically controls operation of the planting clutch 43, the row-limitation clutch 44, the lifting/lowering drive mechanism 12, and the marker operating mechanism 45 based on the path information on the target travel path P and the output of the positioning unit 23 such that a predetermined work (e.g., planting work) by the work device such as the planting unit 13 starts when the rice transplanter 1 has reached a work start point on the target travel path P and such that the predetermined work by the work device such as the planting unit 13 stops when the rice transplanter 1 has reached a work end point on the target travel path P.

Thus, in the rice transplanter 1, the transmission 41, the power steering mechanism 24, the brake operating mechanism 42, the planting clutch 43, the row-limitation clutch 44, the lifting/lowering drive mechanism 12, the marker operating mechanism 45, the vehicle-mounted electronic control unit 46, the vehicle status detection sensor 47, the positioning unit 23, the communication module 54, and the like, constitute the automatic travel unit 2.

The method for generating the target travel path P by the travel path generation unit 74 will be described below.

In a work region R in a farm field, etc., a user or the like drives the rice transplanter 1 so as to travel and actually conduct a work so that the travel path generation unit 74 generates the target travel path P.

Figure 3:
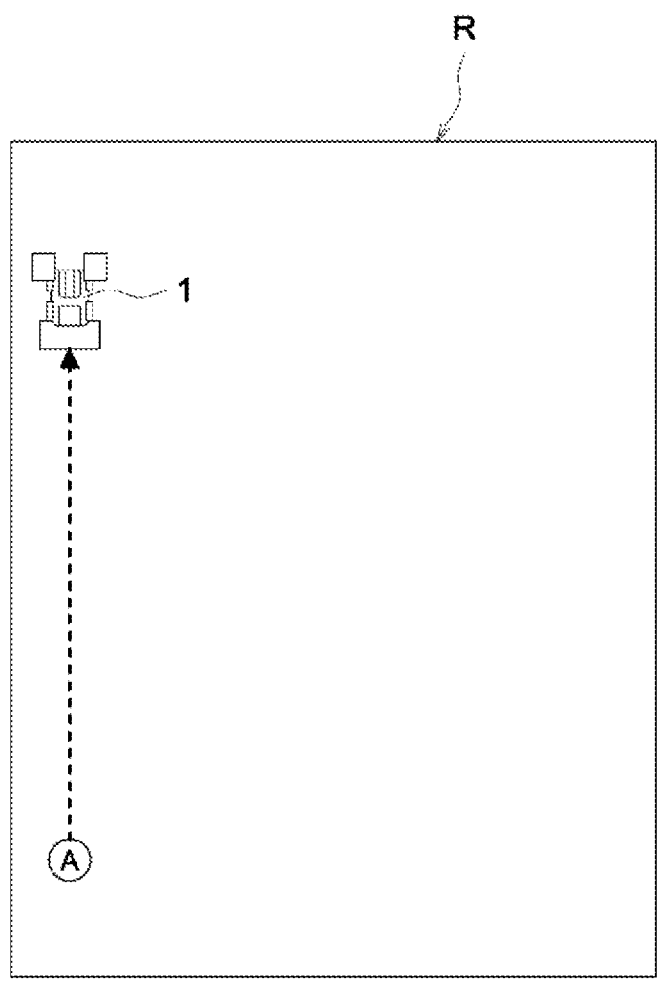
FIG. 3 is a diagram illustrating an operation when a target travel path is generated.
Figure 4:
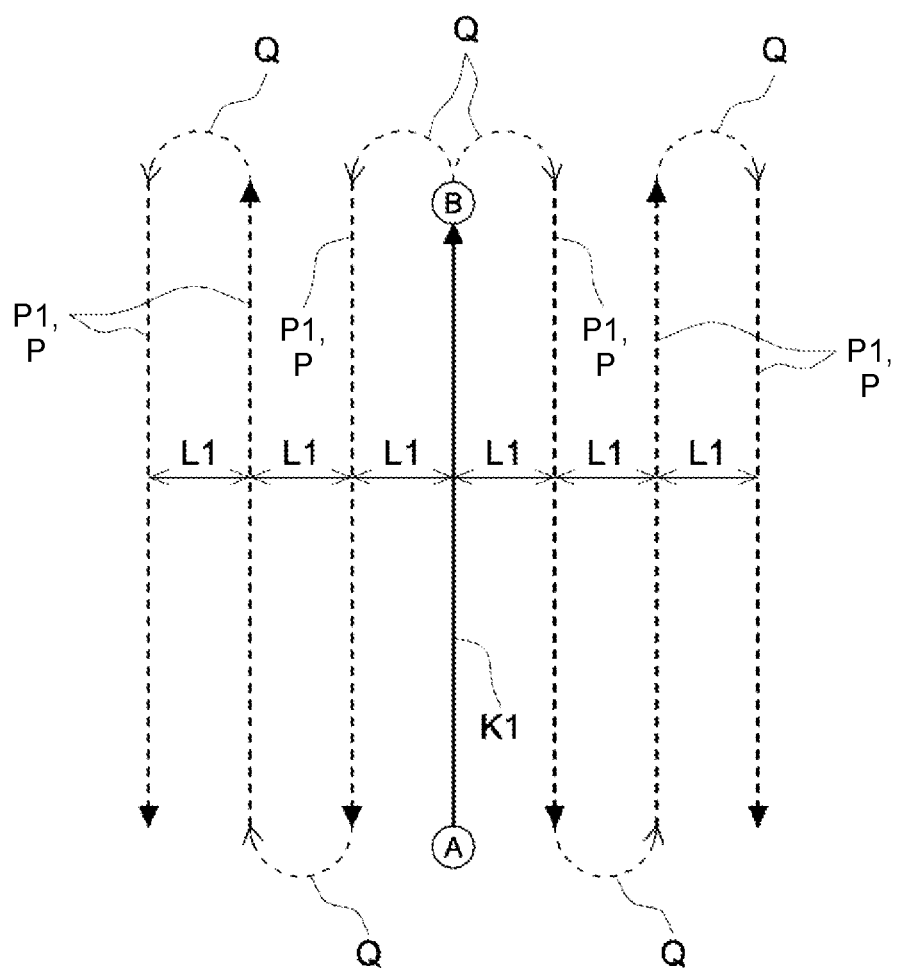
FIG. 4 is a diagram illustrating a state where the target travel path is generated.

As illustrated in FIGS. 3 and 4, in the work region R, a point A and a point B are each registered by traveling of the rice transplanter 1 due to manual operation of the user or the like. In order to register the point A and the point B, as illustrated in FIG. 2, the mobile communication terminal 3 includes a reference point setting unit 76 that sets the point A and the point B and a human-operated reference point setting operating unit 77.

First, as illustrated in FIGS. 3 and 4, the rice transplanter 1 travels from the point A to the point B while the planting unit 13 conducts a planting work. FIG. 3 illustrates a case where the rice transplanter 1 is located at the point B. At this point, the reference point setting unit 76 sets the start point of the work as the point A and the end point of the work as the point B based on an operation of the reference point setting operating unit 77. Although not illustrated, the reference point setting operating unit 77 is displayed on, for example, the display unit 71 of the mobile communication terminal 3 and includes an operation portion for the point A and an operation portion for the point B. As the mobile communication terminal 3 is installed in a terminal holding unit, or the like, provided near the driver seat 26 during the automatic travel, the reference point setting operating unit 77 is an operating tool provided in the rice transplanter 1 (work vehicle).

The reference point setting operating unit 77 is not limited to the one displayed on the display unit 71 of the mobile communication terminal 3, and various operating units may be applied. For example, it may be displayed on the display unit 27 of the rice transplanter 1 or may be an operation switch or an operation button provided near the driver seat 26 of the rice transplanter 1. Furthermore, as described below, a remote controller 200 illustrated in FIG. 17 may be used as the reference point setting operating unit 77, and the user or the like on the rice transplanter 1 may carry the reference point setting operating unit 77 (the remote controller 200).

When the user or the like operates the operation portion for the point A on the reference point setting operating unit 77 while the rice transplanter 1 is located at the start point of the work, the reference point setting unit 76 acquires the position information of the positioning unit 23 (the position information on the rice transplanter 1) at the time of operation and sets the point A (the point determined based on the latitude and longitude) in the work region R. Furthermore, when the rice transplanter 1 reaches the end point of the work and the user or the like operates the operation portion for the point B on the reference point setting operating unit 77, the reference point setting unit 76 sets the point B (the point determined based on the latitude and longitude) in the work region R based on the position information of the positioning unit 23 (the position information on the rice transplanter 1) at the time of operation.

Thus, the reference point setting unit 76 acquires the position information on the rice transplanter 1 by the positioning unit 23 in accordance with the operating timing of the reference point setting operating unit 77 and sets the point A and the point B. The reference point setting unit 76 stores the setting information on the point A and the point B in the terminal storage unit 75.

Figure 5:
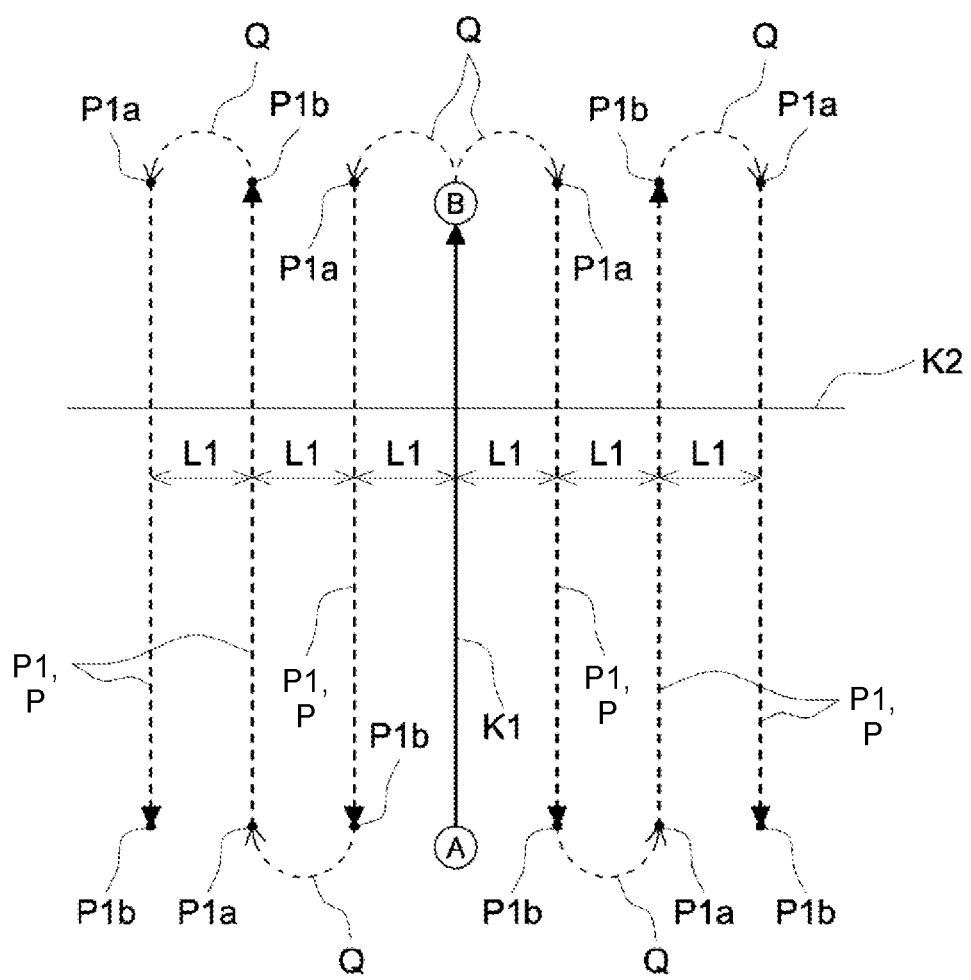
FIG. 5 is a diagram illustrating a state where the target travel path is generated.

After the point A and the point B are set by the reference point setting unit 76, a reference line generation unit 78 (see FIG. 2) generates a first reference line K1 and a second reference line K2 based on the position information on the point A and the point B, as illustrated in FIG. 5. The reference line generation unit 78 generates a straight line connecting the point A and the point B as the first reference line K1 and generates a straight line orthogonal to the first reference line K1 as the second reference line K2. The reference line generation unit 78 stores the position information, or the like, on the generated first reference line K1 and the second reference line K2 in the terminal storage unit 75 (corresponding to a storage unit).

Figure 6:
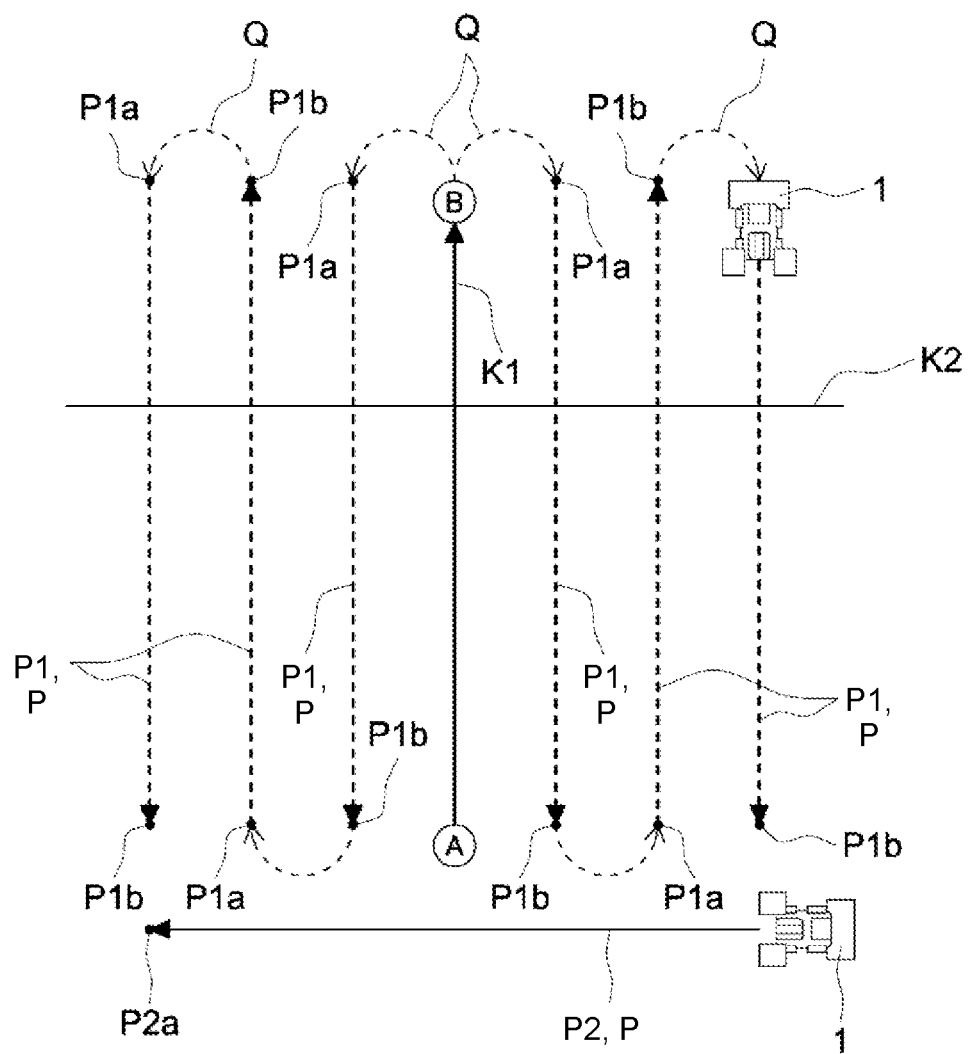
FIG. 6 is a diagram illustrating a state where the target travel path is generated and a state where automatic travel is performed.

As illustrated in FIG. 6, the travel path generation unit 74 generates, as the target travel path P, a path including a first parallel path P1 and a second parallel path P2 that are parallel to the first reference line K1 or the second reference line K2. The first parallel path P1 and the second parallel path P2 are paths for conducting a predetermined work (planting work) while the rice transplanter 1 automatically travels.

To start the automatic travel of the rice transplanter 1, after a predetermined condition for starting the automatic travel is satisfied, the user operates the display unit 71 of the mobile communication terminal 3 to give an instruction to start the automatic travel, whereby the automatic travel of the rice transplanter 1 starts. With regard to the first parallel path P1, as illustrated in FIGS. 4 and 5, the travel path generation unit 74 generates the first parallel path P1 when the reference line generation unit 78 generates the first reference line K1, and thus the first parallel path P1 is previously generated before the predetermined condition for starting the automatic travel is satisfied. Conversely, with regard to the second parallel path P2, the second parallel path P2 is not generated when the reference line generation unit 78 generates the first reference line K1 as illustrated in FIGS. 4 and 5, and the travel path generation unit 74 generates the second parallel path P2 when the predetermined condition for starting the automatic travel is satisfied as illustrated in FIG. 6, and thus the second parallel path P2 is generated after the predetermined condition for starting the automatic travel is satisfied.

With regard to the first parallel path P1, as illustrated in FIG. 5, the travel path generation unit 74 sets, as the first parallel path P1, a path having the same or substantially the same length as that of the first reference line K1 and generates the set number (e.g., six in FIGS. 5 and 6) of the first parallel paths P1 by using an interval between the first reference line K1 and the first parallel path P1 and an interval between the first parallel paths P1 as a set interval L1. The set number may be changed as appropriate, and when work region information about the work region, such as the size of the work region and the shape of the work region, has not been obtained, the first parallel paths P1 are generated also outside the work region, for example, the 500 first parallel paths P1 are generated. Furthermore, when the work region information has been obtained, the set number may be specified so as to fall within the work region.

To generate the set number of the first parallel paths P1, as illustrated in FIGS. 5 and 6, the travel path generation unit 74 may generate the first parallel paths P1 symmetrically with the first reference line K1 at a center or generate the set number of the first parallel paths P1 on the right side or left side of the first reference line K1 that is positioned at an end. With regard to the set interval L1, for example, a work interval based on input information, input by the user or the like, about the work device such as the planting unit 13 is set as the set interval L1. According to the present embodiment, as the rice transplanter 1 is used, the interval between the rows for planting seedlings may be set as the set interval L1.

With regard to the second parallel path P2, as illustrated in FIG. 6, the travel path generation unit 74 generates the second parallel path P2 that passes through the current position of the rice transplanter 1 and is parallel to the second reference line K2. The travel path generation unit 74 sets the current position of the rice transplanter 1 as a start position of the second parallel path P2 and sets, as an end position of the second parallel path P2, the position of the first parallel path P1 located at the most extreme end (in FIG. 6, the position of the first parallel path P1 located at the leftmost position) among the set number of the generated first parallel paths P1 to generate the second parallel path P2.

FIGS. 5 and 6 illustrate a connecting path Q connecting the first reference line K1 and the adjacent first parallel path P1 and the connecting path Q connecting the adjacent first parallel paths P1 for the purpose of reference; however, according to the present embodiment, the travel path generation unit 74 does not generate the connecting path Q. The connecting path Q is a path for changing the traveling direction of the rice transplanter 1 without conducting any work.

When the travel path generation unit 74 generates the target travel path P, the terminal electronic control unit 72 transfers the path information from the mobile communication terminal 3 to the rice transplanter 1 so that the vehicle-mounted electronic control unit 46 of the rice transplanter 1 obtains the path information. Accordingly, the vehicle-mounted electronic control unit 46 may cause the rice transplanter 1 to automatically travel along the target travel path P while acquiring its own current position (the current position of the rice transplanter 1) by the positioning unit 23 based on the acquired path information. The current position of the rice transplanter 1 acquired by the positioning unit 23 is transmitted from the rice transplanter 1 to the mobile communication terminal 3 in real time (e.g., in a cycle of several milliseconds) so that the mobile communication terminal 3 determines the current position of the rice transplanter 1. For example, during the automatic travel of the rice transplanter 1, the display unit 71 of the mobile communication terminal 3 and the display unit 27 of the rice transplanter 1 display the deviation (lateral deviation) between the current position of the rice transplanter 1 and the target travel path P in a direction perpendicular to the traveling direction of the target travel path P. Thus, during the automatic travel of the rice transplanter 1, the user or the like may know how much the position of the rice transplanter 1 has shifted with respect to the target travel path P.

Figure 7:
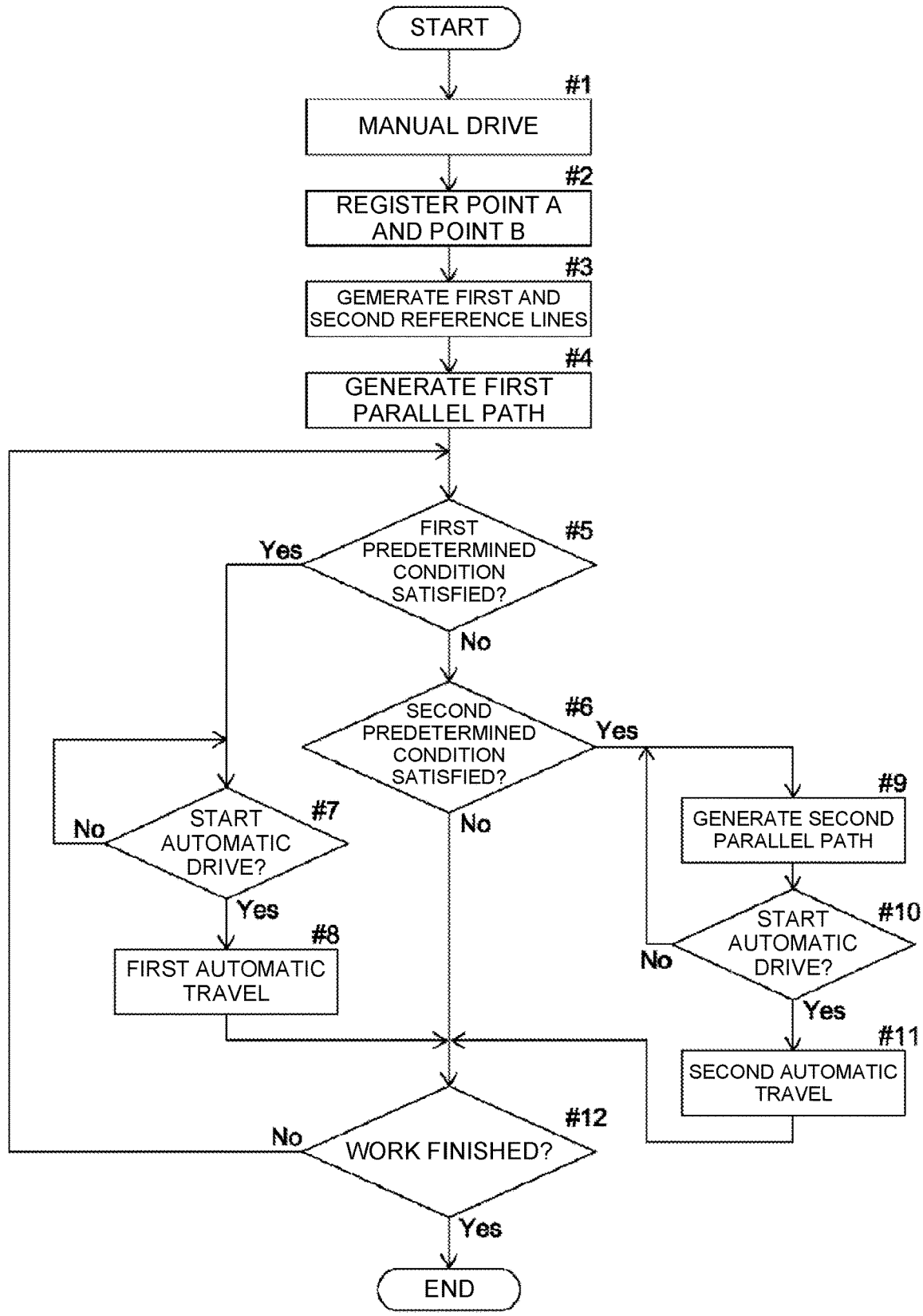
FIG. 7 is a flowchart illustrating a flow of operations when automatic travel is performed.

The flow of operation during the automatic travel is described with reference to the flowchart of FIG. 7.

First, as illustrated in FIGS. 3 and 4, the user or the like manually drives the rice transplanter 1 so as to travel and actually conduct a work, and the reference point setting unit 76 registers (sets) the point A and the point B (Step #1, Step #2). The reference line generation unit 78 generates the first reference line K1 and the second reference line K2 based on the setting information on the point A and the point B, and the travel path generation unit 74 generates the first parallel paths P1 that are parallel to the first reference line K1 (Step #3, Step #4).

The terminal electronic control unit 72 determines whether a first predetermined condition is satisfied in which the orientation of the rice transplanter 1 in the traveling direction and the orientation of the first parallel path P1 in the extending direction fall within a predetermined range or determines whether a second predetermined condition is satisfied in which the rice transplanter 1 in the traveling direction and the orientation of the second reference line K2 in the extending direction fall within a predetermined range (Step #5, Step #6). Here, the orientation of the rice transplanter 1 in the traveling direction may be acquired from measurement information of the positioning unit 23, and the orientation of the reference line in the extending direction may be acquired from position information on the first parallel path P1 and the second reference line K2.

When the first predetermined condition is satisfied, the other predetermined condition for starting the automatic travel is satisfied, and the user operates the display unit 71 of the mobile communication terminal 3 to give an instruction to start the automatic travel, the vehicle-mounted electronic control unit 46 performs, as illustrated on the upper side of FIG. 6, a first automatic travel to cause the rice transplanter 1 to automatically travel along the first parallel path P1 based on the positioning information on the rice transplanter 1 acquired by the positioning unit 23 using the satellite positioning system (Step #8 in the case of Yes at Step #5 and in the case of Yes at Step #7). The first automatic travel is performed for the first parallel path P1 for which the first predetermined condition is satisfied among the previously generated first parallel paths P1.

During the first automatic travel, as illustrated in FIG. 6, the vehicle-mounted electronic control unit 46 causes the rice transplanter 1 to automatically travel in a straight line along the first parallel path P1 such that a work (planting work) using the planting unit 13 starts at a start position P1*a* of the first parallel path P1 and the work (planting work) using the planting unit 13 ends at an end position P1*b* of the first parallel path P1.

When the second predetermined condition is satisfied, the travel path generation unit 74 generates the second parallel path P2 that is parallel to the second reference line K2 (Step #9 in the case of Yes at Step #6). When the user operates the display unit 71 of the mobile communication terminal 3 to give an instruction to start the automatic travel, the vehicle-mounted electronic control unit 46 performs, as illustrated in the lower side of FIG. 6, a second automatic travel to cause the rice transplanter 1 to automatically travel along the second parallel path P2 based on the positioning information on the rice transplanter 1 acquired by the positioning unit 23 using the satellite positioning system (Step #11 in the case of Yes at Step #10).

During the second automatic travel, the vehicle-mounted electronic control unit 46 causes the rice transplanter 1 to automatically travel in a straight line along the second parallel path P2 such that a work (planting work) using the planting unit 13 starts and the work (planting work) using the planting unit 13 ends at an end position P2*a* of the second parallel path P2. As the rice transplanter 1 is manually driven when the work using the planting unit 13 starts, the work using the planting unit 13 may be started by the manual operation of the user, or the like.

Thus, the rice transplanter 1 automatically travels along the first parallel path P1 or the second parallel path P2 when the first predetermined condition or the second predetermined condition is satisfied (Step #5 to Step #11), and these operations are repeatedly performed until the work in the work region of the farm field, or the like, is finished (in the case of No at Step #12). The vehicle-mounted electronic control unit 46 determines that the work in the work region has been completed when a work end condition is satisfied, e.g., the rice transplanter 1 has been moved outside the work region.

As illustrated in FIG. 6, the first parallel paths P1 are generated, and therefore if the rice transplanter 1 automatically travels along one of the first parallel paths P1, the rice transplanter 1 travels by turning (e.g., the connecting path Q) toward the subsequent first parallel path P1 due to the manual operation of the user. Then, when the first predetermined condition is satisfied and the other condition for starting the automatic travel is satisfied, an instruction is given to start the automatic travel so that the rice transplanter 1 automatically travels along the subsequent first parallel path P1. Thus, with regard to the first parallel paths P1, automatic travel along the first parallel path P1→manual travel (manual travel along the connecting path Q)→automatic travel along the subsequent first parallel path P1 are repeatedly performed.

Conversely, with regard to the second parallel path P2, as the second parallel path P2 is generated when the second predetermined condition is satisfied, the automatic travel along the second parallel path P2 is conducted each time the position of the rice transplanter 1 is moved due to the manual operation of the user to the position where the second predetermined condition is satisfied.

When the work in the work region is finished and a setting information deletion condition is satisfied, the terminal electronic control unit 72 deletes the setting information on the point A and the point B and the information about the first reference line K1 and the second reference line K2 stored in the terminal storage unit 75. Thus, the point A and the point B may be registered in the subsequent work region and the first reference line K1 and the second reference line K2 may be generated. Various conditions, e.g., the rice transplanter 1 has moved outside the work region or the set time has elapsed after the end of the automatic travel, may be set as the setting information deletion condition.

As described above, although the rice transplanter 1 automatically travels on the first parallel path P1 and the second parallel path P2, the rice transplanter 1 does not automatically travel on the connecting path Q for changing the traveling direction of the rice transplanter 1, and the rice transplanter 1 is manually driven by the manual operation of the user. Therefore, the vehicle-mounted electronic control unit 46 may cause the rice transplanter 1 to automatically travel on the first parallel paths P1 and the second parallel path P2 and, as illustrated in FIG. 6, allows the rice transplanter 1 to manually travel during the movement from the first parallel path P1 to the subsequent first parallel path P1.

A notification control unit 46G (see FIG. 2) is provided, which conducts a deviation notification indicating the deviation between the position of the rice transplanter 1 after the end of manual travel and the start position of automatic travel in the subsequent first parallel path P1 when the rice transplanter 1 manually travels from the first parallel path P1 to the subsequent first parallel path P1 (when the rice transplanter 1 travels along the connecting path Q by manual driving).

As deviation notification, the notification control unit 46G displays, for example, the current position of the rice transplanter 1 and the subsequent first parallel path P1 in a superimposed manner on the display unit 27 of the rice transplanter 1 so that the user may recognize the deviation between the current position of the rice transplanter 1 and the start position of the automatic travel on the subsequent first parallel path P1. Furthermore, the terminal electronic control unit 72 may cause the display unit 71 of the mobile communication terminal 3 to display the current position of the rice transplanter 1 and the subsequent first parallel path P1 in a superimposed manner on the display unit 27 of the rice transplanter 1. This allows the manually driven rice transplanter 1 to be guided to the start position P1a of the first parallel path P1.

Furthermore, the display unit 27 of the rice transplanter 1, the display unit 71 of the mobile communication terminal 3, and the like, may include a deviation information display unit including a plurality of display lamp units so that the notification control unit 46G and the terminal electronic control unit 72 control a lighting mode of the display lamp units as deviation notification so as to indicate in which direction and how much the current position of the rice transplanter 1 has been shifted with respect to the start position P1a of the subsequent first parallel path P1.

For example, when the current position of the rice transplanter 1 is located within a predetermined range with respect to the start position P1a of the subsequent first parallel path P1, only the display lamp unit located at a center portion among the display lamp units is turned on. When the current position of the rice transplanter 1 is located on the right side out of the predetermined range with respect to the start position P1a of the subsequent first parallel path P1, only the display lamp unit located on the right side of the center portion among the display lamp units is turned on. At this point, as the amount of shift to the right side becomes larger, the number of display lamp units to be turned on may be increased such that the display lamp units located closer to the right side are turned on.

Thus, the notification control unit 46G and the terminal electronic control unit 72 may appropriately change the display mode used to make deviation notification indicating the deviation between the current position of the rice transplanter 1 and the start position P1a of the subsequent first parallel path P1. Furthermore, for example, it is possible to make deviation notification by voice, such as "You are moving close to the right side".

During the automatic travel, in order to prevent the rice transplanter 1 from running out of the work region, the user or the like is notified of the approaching state where the rice transplanter 1 has approached the end of the work region, or the like. As illustrated in FIG. 2, a notification position specifying unit 79 is provided, which specifies a notification position for making end notification to notify the state of approaching to the end of the work region based on the setting information on the point A and the point B and the position information on the first parallel path P1, and the notification control unit 46G is provided, which makes end notification when the current position of the rice transplanter 1 has reached the notification position during the automatic travel of the rice transplanter 1.

The notification position specifying unit 79 is included in the mobile communication terminal 3. As illustrated in FIG. 6, with regard to the first parallel path P1, the notification position specifying unit 79 specifies the end position P1b of the first parallel path P1 as a notification position based on the position information on the point A and the point B. Furthermore, with regard to the second parallel path P2, the notification position specifying unit 79 specifies the end position P2a of the second parallel path P2 as a notification position based on the position information on the first parallel path P1 generated at the most extreme end side.

Thus, the notification position specifying unit 79 specifies the notification position and therefore, during the automatic travel control for causing the rice transplanter 1 to automatically travel, when the notification control unit 46G determines that the current position of the rice transplanter 1 has reached a notification position (e.g., the end position P1b or the end position P2a) based on the positioning information on the rice transplanter 1 acquired by the positioning unit 23 using the satellite positioning system, the notification device 28 is activated to perform end notification so as to notify the user or the like of the approaching state indicating the approach to the end, or the like, of the work region. During the end notification, for example, various types of notifications may be made by the notification device 28 using sound, lighting of an alarm lamp, activation of an alarm buzzer, or the like, indicating the approaching state. Furthermore, during the end notification, not only the notification device 28 of the rice transplanter 1 is activated, but also the mobile communication terminal 3 may notify the approaching state, e.g., the display unit 71 of the mobile communication terminal 3 may display the approaching state.

The vehicle-mounted electronic control unit 46 may also stop the traveling of the rice transplanter 1 in association with the end notification made by the notification control unit 46G. Thus, by stopping the traveling of the rice transplanter 1, it is possible to properly prevent the rice transplanter 1 from running out of the work region.

Figure 8:
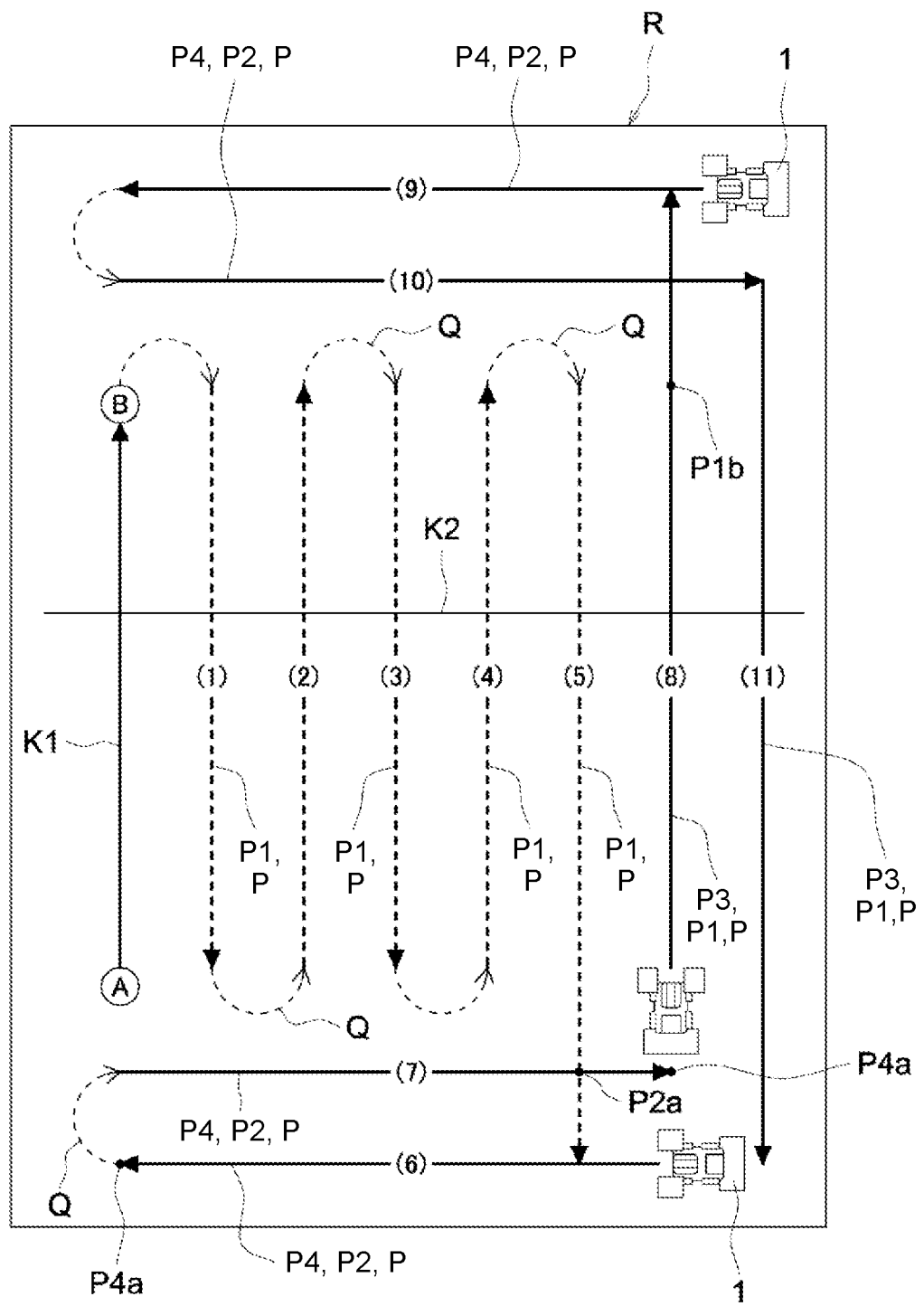
FIG. 8 is a diagram illustrating a state where the target travel path is generated in a work region and a state where automatic travel is performed.

As described above, as the rice transplanter 1 may automatically travel not only on the first parallel path P1 parallel to the first reference line K1 but also on the second parallel path P2 parallel to the second reference line K2, the rice transplanter 1 may automatically travel over the entire work region R and perform a predetermined work (planting work) in the work region R, as illustrated in for example FIG. 8, which results in an improvement in work efficiency.

As illustrated in FIG. 8, the first parallel path P1 parallel to the first reference line K1 is generated so that the rice transplanter 1 automatically travels at a center region in the vertical direction of the work region R, and the second parallel path P2 parallel to the second reference line K2 is generated so that the rice transplanter 1 automatically travels at both end regions in the vertical direction of the work region R.

The travel path generation unit 74 generates, as the first parallel path P1, not only the one having the same path length as that of the first reference line K1 but also an extended first parallel path P3 that has a longer path length than that of the first reference line K1. To generate the extended first parallel path P3, for example, the user operates the display unit 71 of the mobile communication terminal 3 during the automatic travel or manual driving along the first parallel path P1 so that the travel path generation unit 74 extends the first parallel path P1 to the position of the rice transplanter 1 at the time of operation to generate the extended first parallel path P3. Furthermore, the extended first parallel path P3 may be extended by, for example, a preset distance or by a distance set by the user or the like.

The travel path generation unit 74 generates, as the second parallel path P2, not only a path having a path length from the current position of the rice transplanter 1 to the second parallel path P2 generated at the most extreme end side, but also an extended second parallel path P4 having a longer path length than that. To generate the extended second parallel path P4, for example, the user operates the display unit 71 of the mobile communication terminal 3 during the automatic travel or manual driving along the second parallel path P2 so that the travel path generation unit 74 extends the second parallel path P2 to the position of the rice transplanter 1 at the time of operation to generate the extended second parallel path P4. Furthermore, the extended second parallel path P4 may be extended by, for example, a preset distance or by a distance set by the user or the like.

As FIG. 8 illustrates a traveling order for the path along which the rice transplanter 1 automatically travels, a description is given based on the traveling order.

(1) When the first predetermined condition is satisfied in which the orientation of the rice transplanter 1 in the traveling direction and the orientation of the first parallel path P1 in the extending direction in the traveling order (1) fall within the predetermined range, the vehicle-mounted electronic control unit 46 causes the rice transplanter 1 to automatically travel along the first parallel path P1 in the traveling order (1).

(2) When the user manually drives for the travel along the connecting path Q and the first predetermined condition is satisfied in which the orientation of the rice transplanter 1 in the traveling direction and the orientation of the first parallel path P1 in the extending direction in the traveling order (2) fall within the predetermined range, the vehicle-mounted electronic control unit 46 causes the rice transplanter 1 to automatically travel along the first parallel path P1 in the traveling order (2).

As the same operation as that in (1) and (2) is performed for (3) to (5), the description is omitted.

(6) After reaching the end position P1b of the first parallel path P1 in the traveling order (5), the rice transplanter 1 is switched to manual driving and the rice transplanter 1 is moved to a lower right side in the drawing, and when the second predetermined condition is satisfied in which the orientation of the rice transplanter 1 in the traveling direction and the orientation of the second reference line K2 in the extending direction fall within the predetermined range, the extended second parallel path P4 in (6) is generated. Then, the vehicle-mounted electronic control unit 46 causes the rice transplanter 1 to automatically travel along the extended second parallel path P4 in (6).

(7) After reaching an end position P4a of the extended second parallel path P4 in the traveling order (6), the rice transplanter 1 is switched to manual driving and the rice transplanter 1 is moved to an upper side in the drawing, and when the second predetermined condition is satisfied in which the orientation of the rice transplanter 1 in the traveling direction and the orientation of the second reference line K2 in the extending direction in the traveling order (7) fall within the predetermined range, the vehicle-mounted electronic control unit 46 causes the rice transplanter 1 to automatically travel along the second parallel path P2 in the traveling order (7). During this automatic travel, the automatic travel along the extended second parallel path P4 is conducted while the second parallel path P2 is extended from the initially set end position P2a to generate the extended second parallel path P4.

(8) After reaching the end position P4a of the extended second parallel path P4 in the traveling order (7), the rice transplanter 1 is switched to manual driving and the rice transplanter 1 is moved to an upper side in the drawing. When the first predetermined condition is satisfied in which the orientation of the rice transplanter 1 in the traveling direction and the orientation of the first parallel path P1 in the extending direction in the traveling order (8) fall within the predetermined range, the vehicle-mounted electronic control unit 46 conducts the automatic travel along the first parallel path P1 in (8). During this automatic travel, the automatic travel along the extended first parallel path P3 is conducted while the first parallel path P1 is extended from the initially set end position P1b to generate the extended first parallel path P3.

(9) As the same operation as that for the automatic travel on the extended second parallel path P4 in the traveling order (6) is performed, the description is omitted.

(10) As the same operation as that for the automatic travel on the extended second parallel path P4 in the traveling order (7) is performed, the description is omitted.

(11) As the same operation as that for the automatic travel on the extended first parallel path P3 in the traveling order (8) is performed, the description is omitted. On the extended first parallel path P3 in the traveling order (11), the path is extended on both sides, the start position side of the first parallel path P1 and the end position side of the first parallel path P1.

Another embodiment of the interval between the first reference line K1 and the first parallel path P1 and the interval between the adjacent first parallel paths P1 according to the first embodiment is described.

Figure 9:
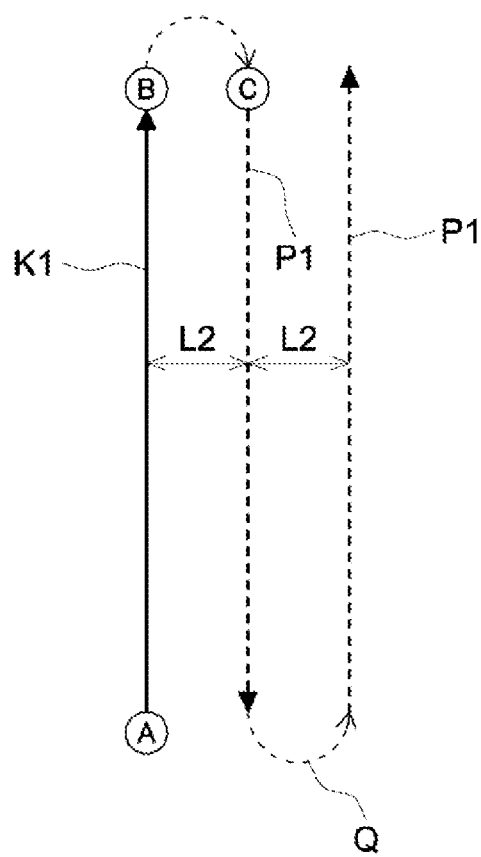
FIG. 9 is a diagram illustrating a state where a first parallel path is generated.

Although the point A and the point B are registered according to the first embodiment as illustrated in FIGS. 3 and 4, a point C may also be registered in addition to the point A and the point B as illustrated in for example FIG. 9. In this case, the travel path generation unit 74 may set an interval L2 between the first reference line K1 and the first parallel path P1 and the interval L2 between the adjacent first parallel paths P1 based on the distance between the point B and the point C. That is, the travel path generation unit 74 may set the interval L2 between the first reference line K1 and the first parallel path P1 and the interval L2 between the adjacent first parallel paths P1 so as to be identical to the distance between the point B and the point C.

Another embodiment of the second reference line K2 according to the first embodiment is described.

Figure 10:
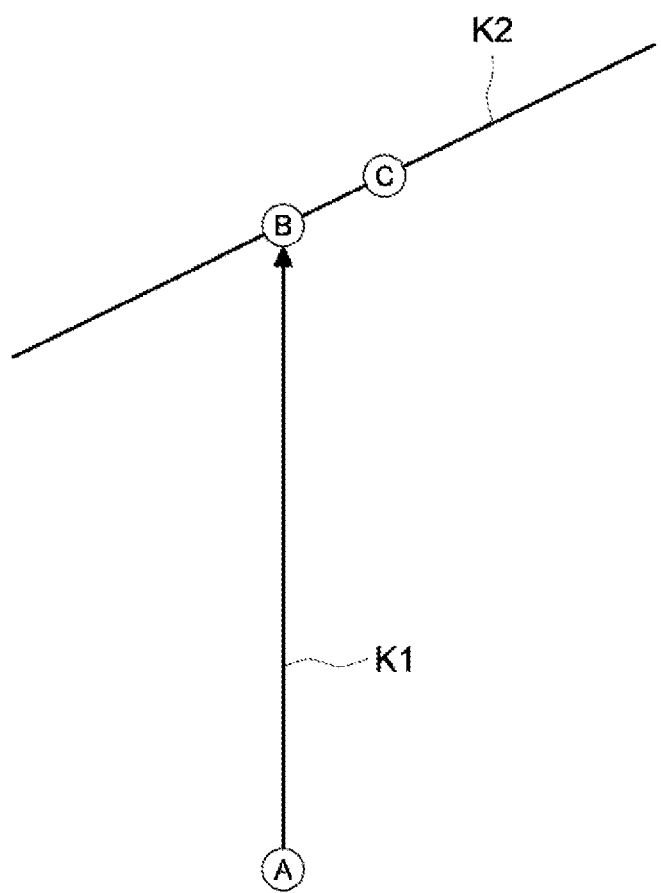
FIG. 10 is a diagram illustrating a state where a second reference line is generated.

Although the second reference line K2 is a straight line orthogonal to the first reference line K1 according to the first embodiment as illustrated in FIGS. 5 and 6, the second reference line K2 is not necessarily a straight line orthogonal to the first reference line K1 and may also be a straight line having a predetermined intersection angle with respect to the first reference line K1. For example, as illustrated in FIG. 10, when the point C is registered in addition to the point A and the point B, the reference line generation unit 78 may generate a straight line connecting the point B and the point C as the second reference line K2.

Figure 11:
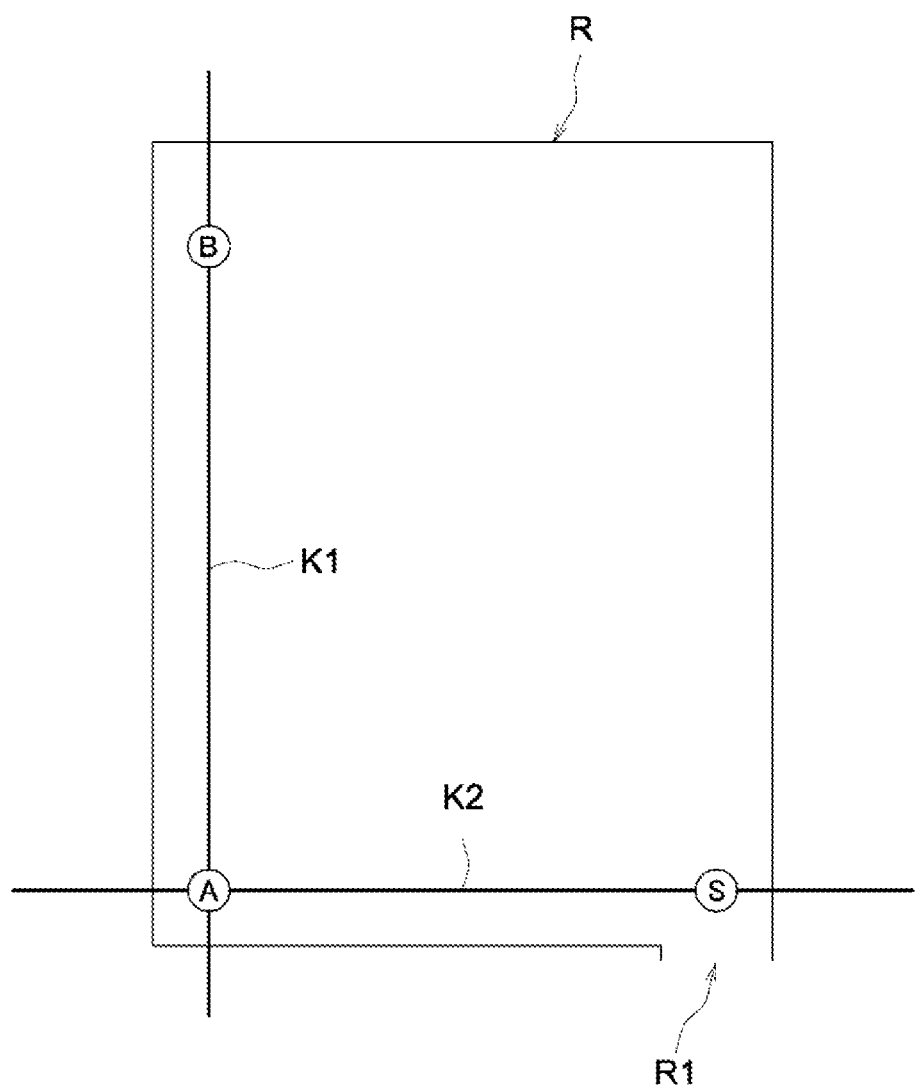
FIG. 11 is a diagram illustrating a state where a first reference line and the second reference line are generated in the work region.

Furthermore, as illustrated in FIG. 11, an exit/entry reference point S corresponding to an exit/entry R1 in the work region R may be registered instead of the point C. In this case, after the exit/entry reference point S is first registered, the point A and the point B are registered. The reference line generation unit 78 may generate, as the second reference line K2, a straight line connecting the exit/entry reference point S and the point A that is the start point of the work. Thus, the second reference line K2 may be a straight line corresponding to the shape of the end of the work region R, and efficient work may be performed in accordance with the shape of the work region R.

Another embodiment of the interval between the first reference line K1 and the first parallel path P1 and the interval between the adjacent first parallel paths P1 according to the first embodiment will be described.

When a predetermined work (planting work) is conducted by the rice transplanter 1 in a work region such as a farm field, the power transmission to the planting devices 30 is blocked (the power transmission is stopped) by the row-limitation clutch 44 in some cases depending on a condition of the work region such as the width of the work region so that the planting work is conducted by only some of the planting devices 30.

Figure 12:
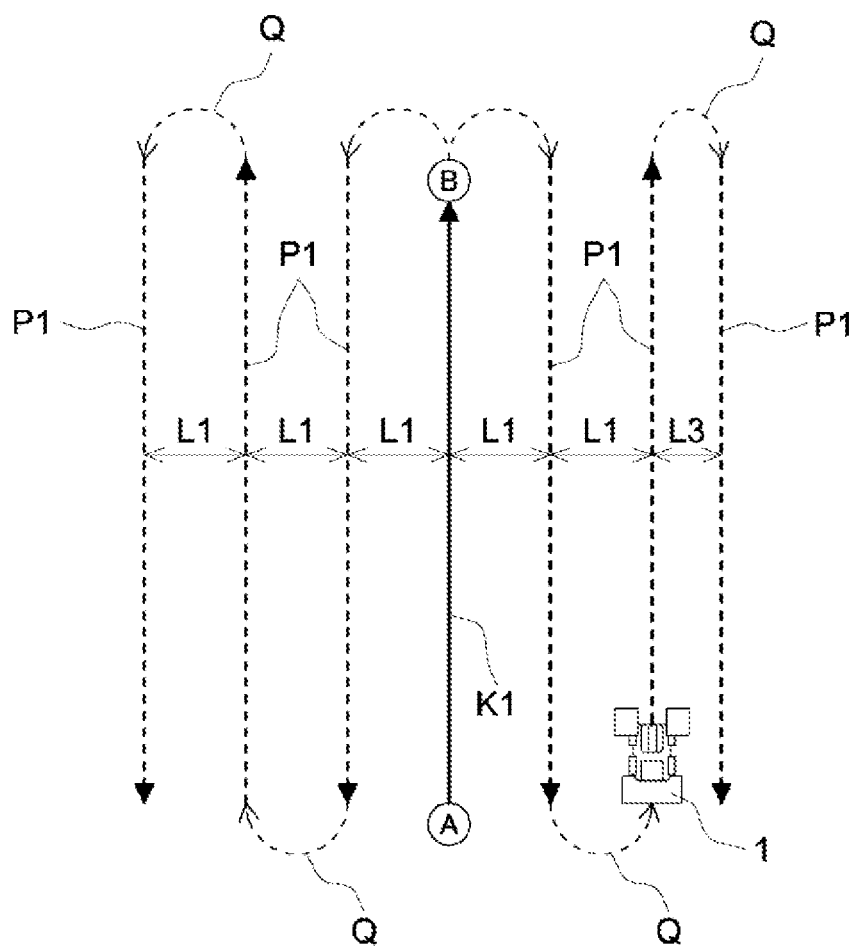
FIG. 12 is a diagram illustrating a state where an interval between adjacent first parallel paths is adjusted.

During the planting work with the row limitation by the row-limitation clutch 44, the working width for the planting work is reduced. Therefore, as illustrated in FIG. 12, the travel path generation unit 74 changes the interval between the first parallel path P1 (the first parallel path P1 that is the second from the right in the drawing), in which the planting work has been conducted with row limitation, and the subsequent first parallel path P1 (the first parallel path P1 that is the rightmost in the drawing) to an interval L3 that is smaller than the interval L1 between the other adjacent first parallel paths P1. Thus, when the planting work is conducted with row limitation, the travel path generation unit 74 causes the subsequent first parallel path P1 to be moved parallel with the currently traveling first parallel path P1 to a closer side by a predetermined distance. The predetermined distance may be set in accordance with the number of the planting devices 30 for which row limitation has been executed, and the predetermined distance is set to be longer as the number of the planting devices 30 for which row limitation has been executed is larger. Furthermore, it may be determined whether a planting work is being conducted with row limitation by detecting the operating state of the row-limitation clutch 44.

Figure 13:
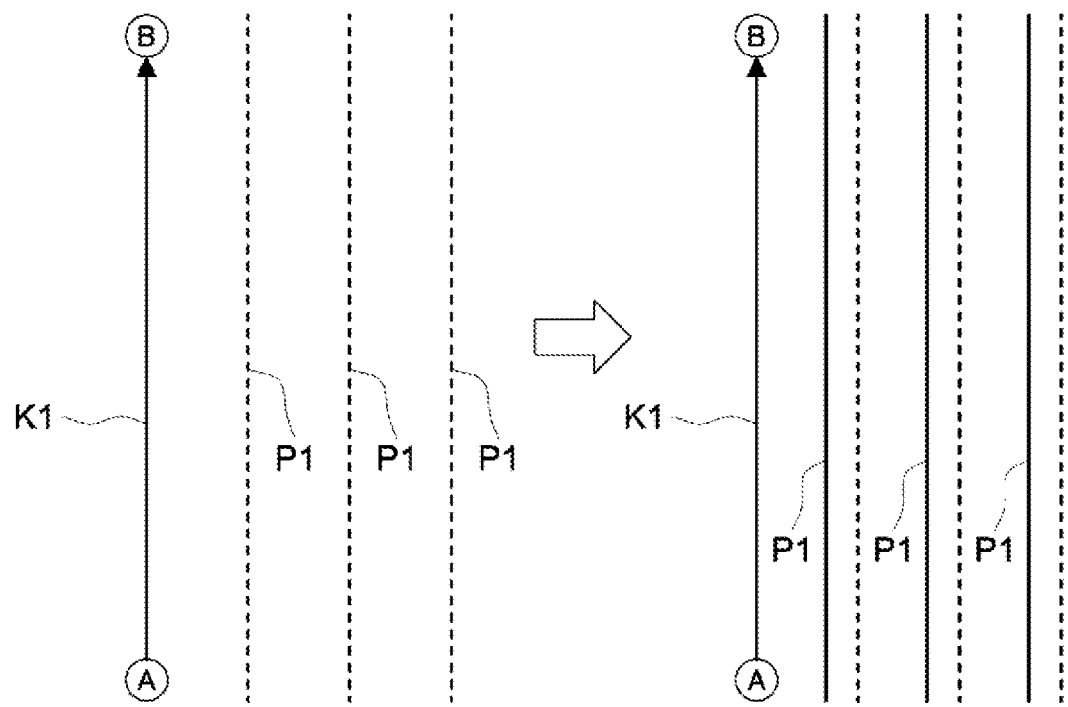
FIG. 13 is a diagram illustrating a state where the first parallel path is moved in parallel.

With regard to the parallel movement of the first parallel paths P1, as illustrated in for example FIG. 13, the user operates the display unit 71 of the mobile communication terminal 3 before the automatic travel is conducted so that the travel path generation unit 74 may move all of the first parallel paths P1 in parallel by a predetermined distance. The left side of FIG. 13 illustrates the state before the first parallel paths P1 are moved in parallel, and the right side thereof illustrates the state after the first parallel paths P1 are moved in parallel. For the first parallel paths P1 illustrated on the right side, the first parallel paths P1 before the parallel movement are illustrated in dotted lines and the first parallel paths P1 after the parallel movement are illustrated in solid lines so as to understand how they have been moved in parallel.

Figure 14:
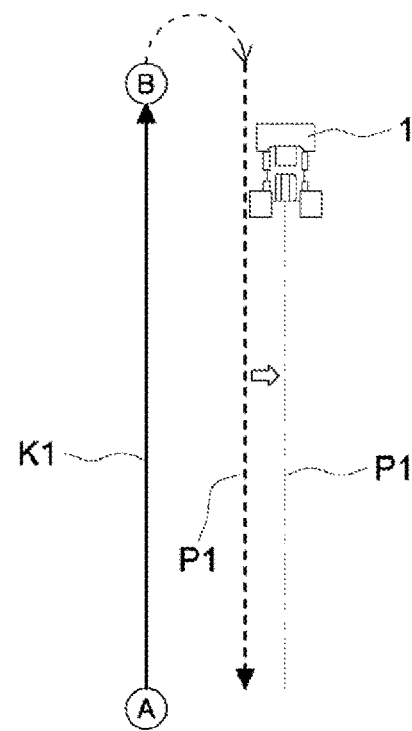
FIG. 14 is a diagram illustrating a state where the first parallel path is moved in parallel.

Furthermore, as illustrated in FIG. 14, when the user operates the display unit 71 of the mobile communication terminal 3 in a state where the position of the rice transplanter 1 has been moved to a position that is displaced from the first parallel path P1 in a lateral direction during automatic travel, the travel path generation unit 74 may move the first parallel path P1 in parallel so that the current position of the rice transplanter 1 matches the first parallel path P1. In FIG. 14, the first parallel path P1 before the parallel movement is illustrated in a dotted line, and the first parallel path P1 after the parallel movement is illustrated in a single dotted line.

Second Embodiment

The second embodiment represents another embodiment of the first embodiment, a different configuration from that in the first embodiment is primarily described, and the same configuration as that in the first embodiment is omitted from the description and is denoted by the same reference numeral, etc.

According to the second embodiment, unlike the first embodiment, the information on the set interval L1 for generating the first parallel paths P1 as illustrated in FIGS. 5 and 6 is not acquired. Therefore, according to the second embodiment, as illustrated in FIGS. 15 and 16, the travel path generation unit 74 selects any reference line from the first reference line K1 and the second reference line K2 based on the position information on the rice transplanter 1 and generates parallel paths P5, P6 that pass through the current position of the rice transplanter 1 and are parallel to the selected reference line.

Figure 15:
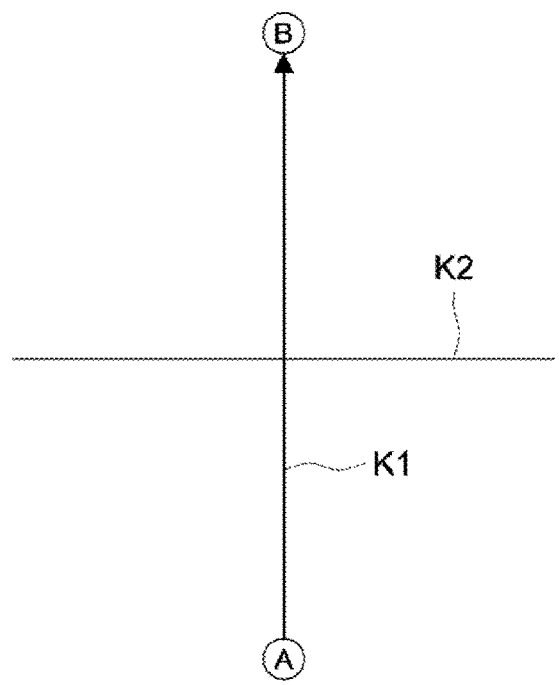
FIG. 15 is a diagram illustrating a state where the first reference line and the second reference line are generated according to a second embodiment.

In the same manner as in the first embodiment, when the reference point setting unit 76 sets the point A and the point B as illustrated in FIG. 15 by the manual driving of the rice transplanter 1, the reference line generation unit 78 generates the first reference line K1 and the second reference line K2. As illustrated in FIG. 16, the travel path generation unit 74 determines whether a predetermined condition for starting automatic travel is satisfied. The predetermined condition is set to a condition in which the orientation of the rice transplanter 1 in the traveling direction and the orientation of the reference line in the extending direction (the orientation of the first reference line K1 in the extending direction or the orientation of the second reference line K2 in the extending walk) fall within a predetermined range. Furthermore, the orientation of the rice transplanter 1 in the traveling direction may be acquired from measurement information of the positioning unit 23, and the orientation of the reference line in the extending direction may be acquired from the position information on the first reference line K1 and the second reference line K2.

When the first predetermined condition is satisfied in which the orientation of the rice transplanter 1 in the traveling direction and the orientation of the first reference line K1 in the extending direction fall within the predetermined range, the travel path generation unit 74 generates the first parallel path P5 that passes through the current position of the rice transplanter 1 and is parallel to the first reference line K1 as illustrated in a dotted line in FIG. 15. The first parallel path P5 is a path having a path length in which the start position is the current position of the rice transplanter 1 and the end position is the position corresponding to the point A or the point B.

Figure 16:
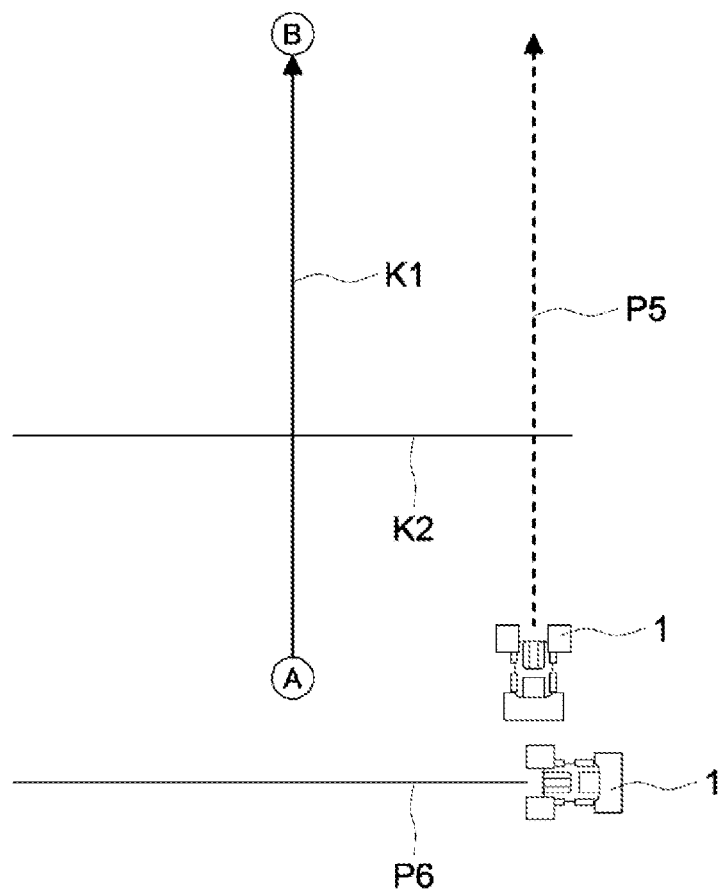
FIG. 16 is a diagram illustrating a state where the first parallel path and a second parallel path are generated according to the second embodiment.

After the first parallel path P5 is thus generated, when the other predetermined condition for starting the automatic travel is satisfied and the user operates the display unit 71 of the mobile communication terminal 3 to give an instruction to start the automatic travel, the vehicle-mounted electronic control unit 46 conducts the first automatic travel to cause the rice transplanter 1 to automatically travel along the first parallel path P5 based on the positioning information on the rice transplanter 1 acquired by the positioning unit 23 using the satellite positioning system, as indicated in the dotted line in FIG. 16.

When the second predetermined condition is satisfied in which the orientation of the rice transplanter 1 in the traveling direction and the orientation of the second reference line K2 in the extending direction fall within the predetermined range, the travel path generation unit 74 generates the second parallel path P6 that passes through the current position of the rice transplanter 1 and is parallel to the second reference line K2, as indicated in a solid line in FIG. 16. The second parallel path P6 is a path having a path length corresponding to a set distance with the current position of the rice transplanter 1 as a start position. The set distance may be set appropriately and, for example, may be variably set by the user.

After the second parallel path P6 is thus generated, when the other predetermined condition for starting the automatic travel is satisfied and the user operates the display unit 71 of the mobile communication terminal 3 to given an instruction to start the automatic travel, the vehicle-mounted electronic control unit 46 conducts the second automatic travel to cause the rice transplanter 1 to automatically travel along the second parallel path P6 based on the positioning information on the rice transplanter 1 acquired by the positioning unit 23 using the satellite positioning system, as indicated in the solid line in FIG. 16.

According to the second embodiment, the first parallel path P5 or the second parallel path P6 is generated when the first predetermined condition or the second predetermined condition is satisfied, and the rice transplanter 1 automatically travels along the generated first parallel path P5 or the second parallel path P6.

The flow of operation for the automatic travel according to the second embodiment is described with reference to FIG. 7.

According to the second embodiment, the timing for generating the first parallel path P5 is different from that in the first embodiment. According to the first embodiment, in FIG. 7, the first reference path is generated at timing after the first reference line K1 and the second reference line K2 are generated and before the first predetermined condition or the second predetermined condition is satisfied. Conversely, according to the second embodiment, in FIG. 7, the first parallel path P5 is generated at timing after the first predetermined condition is satisfied. That is, in FIG. 7, Step #4 of "Generate the first parallel path" is changed to be between Step #5 of "First predetermined condition satisfied?" and Step #7 of "Start automatic travel?", and the other operations are the same as the flow of operations illustrated in the flowchart of FIG. 7.

Third Embodiment

The third embodiment represents another embodiment of the first embodiment, and a configuration different from that in the first embodiment is primarily described, and the same configuration as that in the first embodiment is omitted from the description and is denoted by the same reference numeral, etc.

Figure 17:
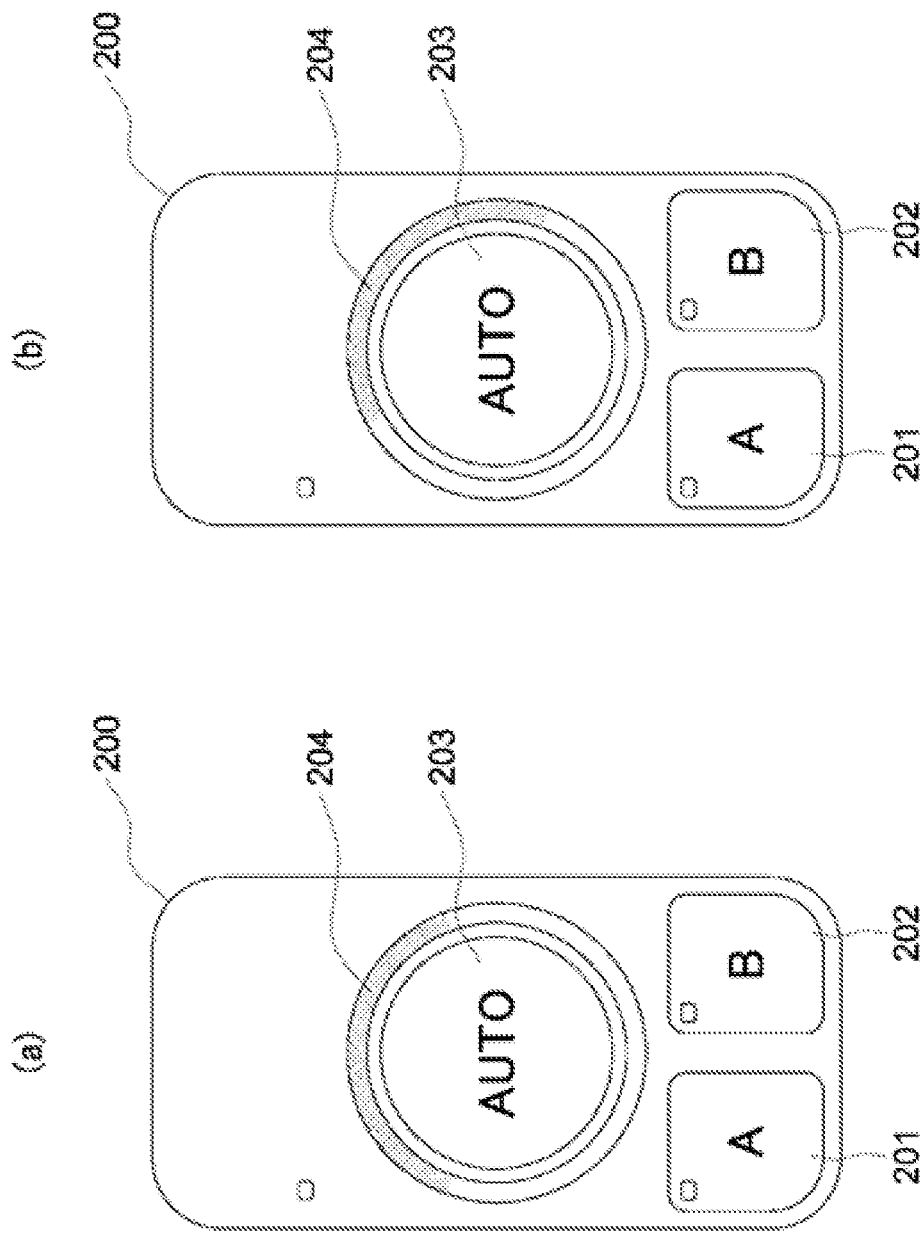
FIG. 17 is a diagram illustrating a remote controller.

According to the third embodiment, unlike the first embodiment, the remote controller 200 is provided as illustrated in FIG. 17 in addition to or instead of the mobile communication terminal 3. For example, when the remote controller 200 is provided instead of the mobile communication terminal 3, the vehicle-mounted electronic control unit 46 includes the travel path generation unit 74, the reference point setting unit 76, the reference line generation unit 78, the notification position specifying unit 79, and the like, as illustrated in FIG. 18.

In this case, the vehicle-mounted storage unit 46F stores information about the point A and the point B set by the reference point setting unit 76, information about the first reference line K1 and the second reference line K2 generated by the reference line generation unit 78, and information about the target travel path P such as the first parallel path P1 and the second parallel path P2 generated by the travel path generation unit 74, and therefore the vehicle-mounted storage unit 46F corresponds to a storage unit.

Figure 18:
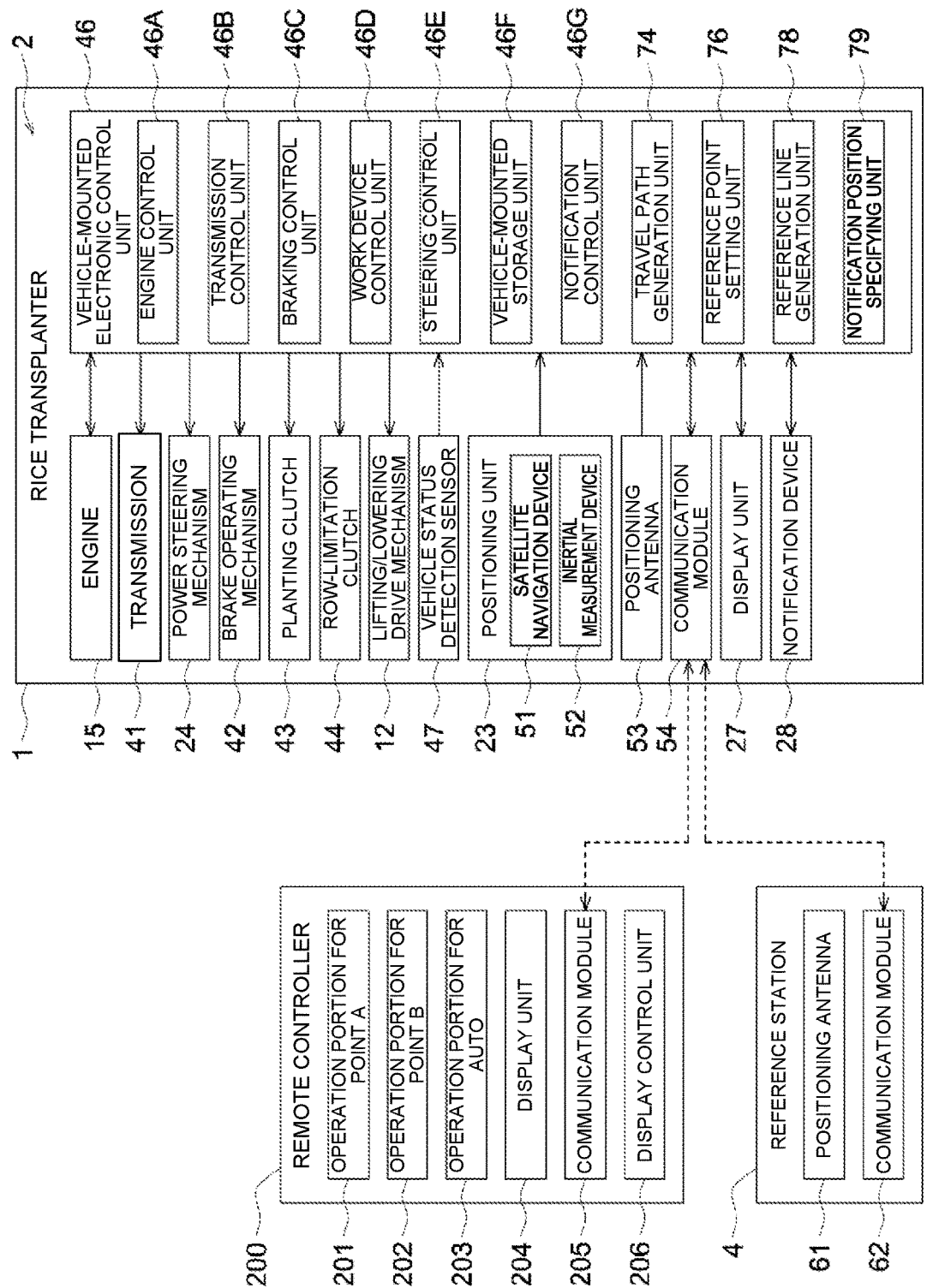
FIG. 18 is a block diagram illustrating a schematic configuration of the automatic travel system.

As illustrated in FIGS. 17 and 18, the remote controller 200, which may be carried by the user or the like, is provided as the reference point setting operating unit 77. The remote controller 200 is configured to communicate various types of information with the vehicle-mounted electronic control unit 46 of the rice transplanter 1 via the communication modules 54, 205, or the like. As illustrated in FIG. 17, the remote controller 200 includes an operation portion 201 for the point A to register the point A, an operation portion 202 for the point B to register the point B, and a circular operation portion 203 for AUTO to give an instruction for automatic travel. A ring-shaped display unit 204 including a plurality of light emitting units such as LEDs is provided around the circular operation portion 203 for AUTO, and the display unit 204 is configured to switch to a plurality of display modes by using different lighting states of the light emitting units.

According to the third embodiment, when the reference point setting unit 76 sets the point A and the point B, the operation target operated by the user is the remote controller 200. Therefore, when the operation portion 201 for the point A in the remote controller 200 is operated, the reference point setting unit 76 acquires the position information of the positioning unit 23 (the position information on the rice transplanter 1) at the time of operation and sets the point A (the point determined based on the latitude and longitude). Furthermore, when the operation portion 202 for the point B in the remote controller 200 is operated, the reference point setting unit 76 acquires the position information of the positioning unit 23 (the position information on the rice transplanter 1) at the time of operation and sets the point B (the point determined based on the latitude and longitude).

According to the third embodiment, similarly to the first embodiment, as illustrated in FIG. 6, although the rice transplanter 1 automatically travels along the first parallel path P1 and the second parallel path P2, the rice transplanter 1 does not automatically travel along the connecting path Q for changing the traveling direction of the rice transplanter 1, but the rice transplanter 1 is manually driven by user's manual operation. Therefore, when the rice transplanter 1 is manually driven from the first parallel path P1 to the subsequent first parallel path P1 (when the rice transplanter 1 is manually driven to travel along the connecting path Q), deviation notification is conducted to indicate the deviation between the position of the rice transplanter 1 after the end of the manual travel and the start position of the automatic travel in the subsequent first parallel path P1.

With regard to the deviation notification, although the deviation notification is conducted by using the display unit 27 of the rice transplanter 1 and the display unit 71 of the mobile communication terminal 3 according to the first embodiment, the remote controller 200 is provided according to the third embodiment, and therefore the deviation notification using the remote controller 200 will be described.

As illustrated in FIG. 18, the remote controller 200 includes a display control unit 206 that controls a display mode of the display unit 204. As the deviation notification, for example, the display control unit 206 controls the lighting state of the light emitting units in the display unit 204 to indicate the deviation between the current position of the rice transplanter 1 and the start position P1a of the subsequent first parallel path P1. For example, when the current position of the rice transplanter 1 is located within a predetermined range with respect to the start position P1a of the subsequent first parallel path P1, only the light emitting unit located at a center portion among the light emitting units is turned on, as illustrated in gray in FIG. 18(a). When the current position of the rice transplanter 1 falls outside the predetermined range with respect to the start position P1a of the subsequent first parallel path P1 and located on the left side, only the light emitting units located on the center portion and the right side among the light emitting units are turned on, as illustrated in gray in FIG. 18(b). As the amount of shift to the left side becomes larger, the number of light emitting units to be turned on may be increased such that the light emitting units located further on the right side are turned on.

The display of the display unit 204 of the remote controller 200 allows the user to recognize in which direction and how much the current position of the rice transplanter 1 has been shifted with respect to the start position P1a of the subsequent first parallel path P1. Furthermore, when the current position of the rice transplanter 1 falls outside the predetermined range with respect to the start position P1a of the subsequent first parallel path P1 and is located on the left side, only the light emitting units located on the center portion and the right side of the ring-shaped display unit 204 are turned on so as to enable the user's easy recognition of the direction in which the steering wheel 25 is to be operated and enable smooth guide to the start position P1a of the subsequent first parallel path P1.

Other Embodiment

Another embodiment of the present invention will be described.

The configurations in the respective embodiments described below are not necessarily applied independently but may be applied in combination with the configuration in the other embodiment.

(1) Various modifications may be made to the configuration of the work vehicle.

For example, the work vehicle may be configured as a hybrid including the engine 15 and an electric motor for traveling or may be configured to have electric power including an electric motor for traveling in place of the engine 15.

For example, the work vehicle may be configured for rear-wheel steering with the right and left rear wheels 20 functioning as steering wheels.

(2) Although the mobile communication terminal 3 includes the travel path generation unit 74, the reference point setting unit 76, the reference line generation unit 78, the notification position specifying unit 79, and the like, according to the above-described first embodiment, for example, the rice transplanter 1 or an external management device may include the travel path generation unit 74, the reference point setting unit 76, the reference line generation unit 78, the notification position specifying unit 79, and the like, and the installation location may be changed as appropriate.

(3) Although the travel path generation unit 74 does not generate the connecting path Q and the rice transplanter 1 does not automatically travel along the connecting path Q according to the above embodiment, the travel path generation unit 74 may generate and store the connecting path Q in the terminal storage unit 75, or the like, so that the vehicle-mounted electronic control unit 46 may cause the rice transplanter 1 to automatically travel along the connecting path Q. In this case, the automatic travel along the first parallel path P1 may be followed by the automatic travel along the connecting path Q, and then further followed by the automatic travel along the subsequent first parallel path P1. Thus, the rice transplanter 1 may travel automatically and continuously along the first parallel paths P1 and the connecting paths Q.

DESCRIPTION OF REFERENCE NUMERALS

1 Rice transplanter (work vehicle)
46 Vehicle-mounted electronic control unit (automatic travel control unit)
46F Vehicle-mounted storage unit (storage unit)
46G Notification control unit
74 Travel path generation unit
75 Terminal storage unit (storage unit)
206 Display control unit
K1 First reference line
K2 Second reference line
P1 First parallel path
P2 Second parallel path
P5 First parallel path
P6 Second parallel path

The invention claimed is:

1. An automatic travel system comprising:
a travel path generation unit that generates a parallel path that is parallel to a first reference line or a second reference line; and
an automatic travel control unit that causes a work vehicle to automatically travel along the parallel path generated by the travel path generation unit,
wherein the first reference line is generated based on an operation of a user and the second reference line is generated based on the first reference line, where the first reference line is not parallel to the second reference line.

2. The automatic travel system according to claim 1, wherein the travel path generation unit selects any reference line from the first reference line and the second reference line based on position information of the work vehicle and generates the parallel path that passes through a current position of the work vehicle and is parallel to the selected reference line.

3. The automatic travel system according to claim 1, wherein the travel path generation unit is capable of generating, as the parallel path, a plurality of first parallel paths that are parallel to the first reference line, at a predetermined interval, and is capable of generating a second parallel path that passes through the current position of the work vehicle and is parallel to the second reference line.

4. The automatic travel system according to claim 1, wherein
the automatic travel control unit is capable of causing the work vehicle to automatically travel in a plurality of parallel paths and allows manual travel of the work vehicle during a movement from the parallel path to a subsequent parallel path, and
the automatic travel system comprises a notification control unit that, when manual travel of the work vehicle from the parallel path to the subsequent parallel path is conducted, provides notification indicating a deviation between a position of the work vehicle after an end of the manual travel and a start position of automatic travel in the subsequent parallel path.

5. The automatic travel system according to claim 1, wherein
the travel path generation unit selects either the first reference line or the second reference line based on position information of the work vehicle, and generates a parallel path that is parallel to the selected reference line.

* * * * *